(12) United States Patent
Yadavalli

(10) Patent No.: US 11,907,714 B2
(45) Date of Patent: *Feb. 20, 2024

(54) SECURE MATRIX SPACE WITH PARTITIONS FOR CONCURRENT USE

(71) Applicant: ONNIVATION LLC, San Jose, CA (US)

(72) Inventor: Sitaram Yadavalli, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/553,600

(22) Filed: Dec. 16, 2021

(65) Prior Publication Data

US 2022/0156066 A1  May 19, 2022

Related U.S. Application Data

(63) Continuation of application No. 16/783,125, filed on Feb. 5, 2020, now Pat. No. 11,237,828, which is a continuation-in-part of application No. 16/396,680, filed on Apr. 27, 2019, and a continuation-in-part of application No. 15/598,322, filed on May 18, 2017, (Continued)

(51) Int. Cl.
| | | |
|---|---|---|
| *G11C 8/00* | (2006.01) | |
| *G06F 9/30* | (2018.01) | |
| *G06F 9/455* | (2018.01) | |
| *G06F 17/16* | (2006.01) | |
| *G06F 3/06* | (2006.01) | |
| *G11C 11/4094* | (2006.01) | |
| *G06F 21/71* | (2013.01) | |

(52) U.S. Cl.
CPC ............ *G06F 9/3001* (2013.01); *G06F 3/064* (2013.01); *G06F 3/0622* (2013.01); *G06F 3/0679* (2013.01); *G06F 9/3009* (2013.01); *G06F 9/30101* (2013.01); *G06F 9/45558* (2013.01); *G06F 17/16* (2013.01); *G06F 21/71* (2013.01); *G11C 11/4094* (2013.01); *G06F 2009/45591* (2013.01)

(58) Field of Classification Search
CPC ....................................................... G06F 3/01
See application file for complete search history.

(56) References Cited

U.S. PATENT DOCUMENTS

| | | | |
|---|---|---|---|
| 8,503,264 B1 * | 8/2013 | Narayanan | ............... G11C 5/14 365/229 |
| 11,237,828 B2 * | 2/2022 | Yadavalli | ............. G11C 7/1006 |

(Continued)

*Primary Examiner* — Min Huang

(57) ABSTRACT

This application discloses a mechanism to securely store and compute with a matrix of numbers or any two-dimensional array of binary values in a storage entity called a matrix space. A matrix space is designed to store matrices or arrays of values into arrays of volatile or non-volatile memory cells with accessibility in two or three dimensions. Any row or column or line of storage elements in the storage entity is directly accessible for writing, reading, or clearing via row bit lines and column bit lines, respectively. The elements in rows of the arrays are selected or controlled for access using row address lines and the elements in columns of the arrays are selected or controlled for access using column address lines. Access control methods and mechanisms with keys to secure, share, lock, and unlock regions in the matrix space for matrices and arrays under the control of an operating system or a virtual-machine hypervisor by permitted threads and processes are also disclosed.

29 Claims, 15 Drawing Sheets

Related U.S. Application Data now Pat. No. 10,600,475, said application No. 16/396,680 is a continuation-in-part of application No. 15/488,494, filed on Apr. 16, 2017, now abandoned.

(60) Provisional application No. 62/338,418, filed on May 18, 2016, provisional application No. 62/327,949, filed on Apr. 26, 2016.

(56) References Cited

U.S. PATENT DOCUMENTS

| | | | |
|---|---|---|---|
| 2005/0169040 A1* | 8/2005 | Peng | H10B 12/09 |
| | | | 257/E27.084 |
| 2006/0005260 A1* | 1/2006 | Haruki | G06F 21/57 |
| | | | 726/27 |
| 2006/0095699 A1* | 5/2006 | Kobayashi | G06F 12/1458 |
| | | | 711/164 |
| 2013/0191617 A1* | 7/2013 | Ishikawa | G06F 9/4881 |
| | | | 712/216 |
| 2014/0019717 A1* | 1/2014 | Yamashita | G06F 9/30087 |
| | | | 712/42 |
| 2015/0150024 A1* | 5/2015 | Grossi | G06F 9/30134 |
| | | | 718/107 |
| 2017/0090814 A1* | 3/2017 | Yeung | G06F 3/0673 |
| 2018/0063100 A1* | 3/2018 | Peeters | H04L 63/061 |

* cited by examiner

Icon for an array of nibble cells with column and row block selectors and column and row address lines

SECURE MATRIX SPACE WITH PARTITIONS FOR CONCURRENT USE

CROSS-REFERENCE TO RELATED DOCUMENTS

The present application claims the benefit of priority to co-pending U.S. patent application Ser. No. 16/783,125 titled "SECURE MATRIX SPACE WITH PARTITIONS FOR CONCURRENT USE" filed on Feb. 5, 2020, which is a Continuation in Part of U.S. Non-Provisional patent application Ser. No. 15/598,322 (titled "METHOD AND APPARATUS FOR STORING AND ACCESSING MATRICES AND ARRAYS BY COLUMNS AND ROWS IN A PROCESSING UNIT" filed on May 18, 2017), which claimed priority to U.S. Provisional Application Ser. No. 62/338,418, filed on May 18, 2016, and further, the co-pending application Ser. No. 16/783,125 is also Continuation in Part of U.S. Non-Provisional application Ser. No. 16/396,680 (titled "COMPUTING MACHINE USING A MATRIX SPACE FOR MATRIX AND ARRAY PROCESSING" filed on Apr. 27, 2019) which is a Continuation in Part of U.S. Non-Provisional application Ser. No. 15/488,494 filed Apr. 16, 2017 (titled "COMPUTING MACHINE ARCHITECTURE FOR MATRIX AND ARRAY PROCESSING") which claimed priority to U.S. Provisional Application Ser. No. 62/327,949 filed on Apr. 26, 2016 ("COMPUTING MACHINE ARCHITECTURE FOR MATRIX AND ARRAY PROCESSING"), with each of the applications incorporated herein by reference in its entirety, and to the extent appropriate, a claim of priority is made to the above disclosed applications.

BACKGROUND OF THE INVENTION

In mathematics, a matrix is a 2-Dimensional (2D) array of numerical elements. We extend this to any regular 2D array or collection of numbers or characters or ordered pairs or simply binary values. A generalization to a 3-Dimensional or higher dimensional array or collection of binary values referred to as a matroid, is also included in this application. A vector is a matrix with 1 column or with 1 row as is commonly understood.

Parallel processing of arithmetic vectors in SIMD (Single Instruction Multiple Data) paradigm has been prior art for several years now. That involves vectors of numbers stored in vector registers such that one or more of vector registers are used in a vector computation much like scalar numbers are used in a scalar computation. In prior art, a matrix may be stored using multiple vector registers where each row of the matrix (row major) can be read at the interface as row data for computation. Alternately, in prior art, the matrix is stored as one column per vector register (column major) and read one matrix column length at a time for computation. In prior art, a matrix stored using its rows is not readable by its columns along its data interface in a single step. Alternately, a matrix may be stored in row major or column major manner in a memory. In all such cases only individual row length of elements (or column length of elements) of the matrix can be directly accessed in a single step in any computation. Otherwise, a complicated transformation of the row major (or column major) matrix to its transpose is needed.

Prior art uses a register file or a multi-port RAM or a memory to store binary values or numbers or characters as operands for computation. In prior art, plurality of bits of a numerical value (i.e. a number) are stored in a single string of RAM cells forming a register in a register file or a line in a memory. When accessed, all the bits of the register or memory line are addressed using a word-line and are available at the same time. Vector values are stored in longer registers or lines which store a plurality of scalar binary values that are accessible using a common address and are available at the same time. The vector register file or any register file or memory in prior art uses a set of word-lines to access or address its individual registers or lines and the values in the cells of the addressed register or line are read out on to an interface of bit-lines. This puts a limitation on the prior art that does it not allow a column vector of elements of a register file holding rows of vectors or from multiple lines of a memory holding rows of a matrix to be read out in a single operation to perform computations directly on them collectively. This requires a transformation of the row vector or matrix or creation of a transposed copy of the row vector or matrix to carry out such an operation on the columns.

This application describes mechanisms to eliminate the above-mentioned limitations to store and access a matrix or array of numbers or binary valued words in a processing unit for performing computations that require accessing elements along both the rows and columns of the matrices or arrays.

It further describes mechanisms to partition the storage into regions that can be independently secured and used concurrently by one or more applications and one or more users with one or more operating systems.

BRIEF SUMMARY OF THE INVENTION

This application discloses a mechanism to securely store and compute with matrices of numbers or any multi-dimensional arrays of binary values in a storage entity called a Matrix Space. A Matrix Space that may reside in a processor is designed to store a plurality of matrices or arrays or matroids (3D array of numbers) using individual volatile or non-volatile RAM (Random Access Memory) cells or latch (or flip-flop) elements, much like in a memory but with accessibility in two or three dimensions. In this invention any row and/or column of a storage array is directly accessible via row and column bit lines respectively. The values in a row of the matrix or array are selected for access using row address lines and the values in the columns of the matrix or array are selected for access using column address lines (much like word lines). This allows access to data words in matrices and arrays by columns and by rows of a matrix/array to use them in parallel matrix/array computations.

DETAILED DESCRIPTION OF THE INVENTION

This application presents mechanisms to store a matrix of numbers or any generic array of values in a new storage entity called a Matrix Space in a secure manner. A matrix space that may reside in a processing unit is designed to store one or more matrices or arrays or matroids (3D array of numbers) using individual storage cells or latch elements, much like in any randomly accessible volatile or non-volatile memory but which are accessible in two dimensions, both along the rows or along the columns of the array. It discloses a set of machine instructions and methods to load, store and compute with matrices, and also methods and mechanisms to secure, share, lock and unlock regions in a Matrix Space under the control of an operating system or virtual machine monitor when in use by a process.

Figure 1:
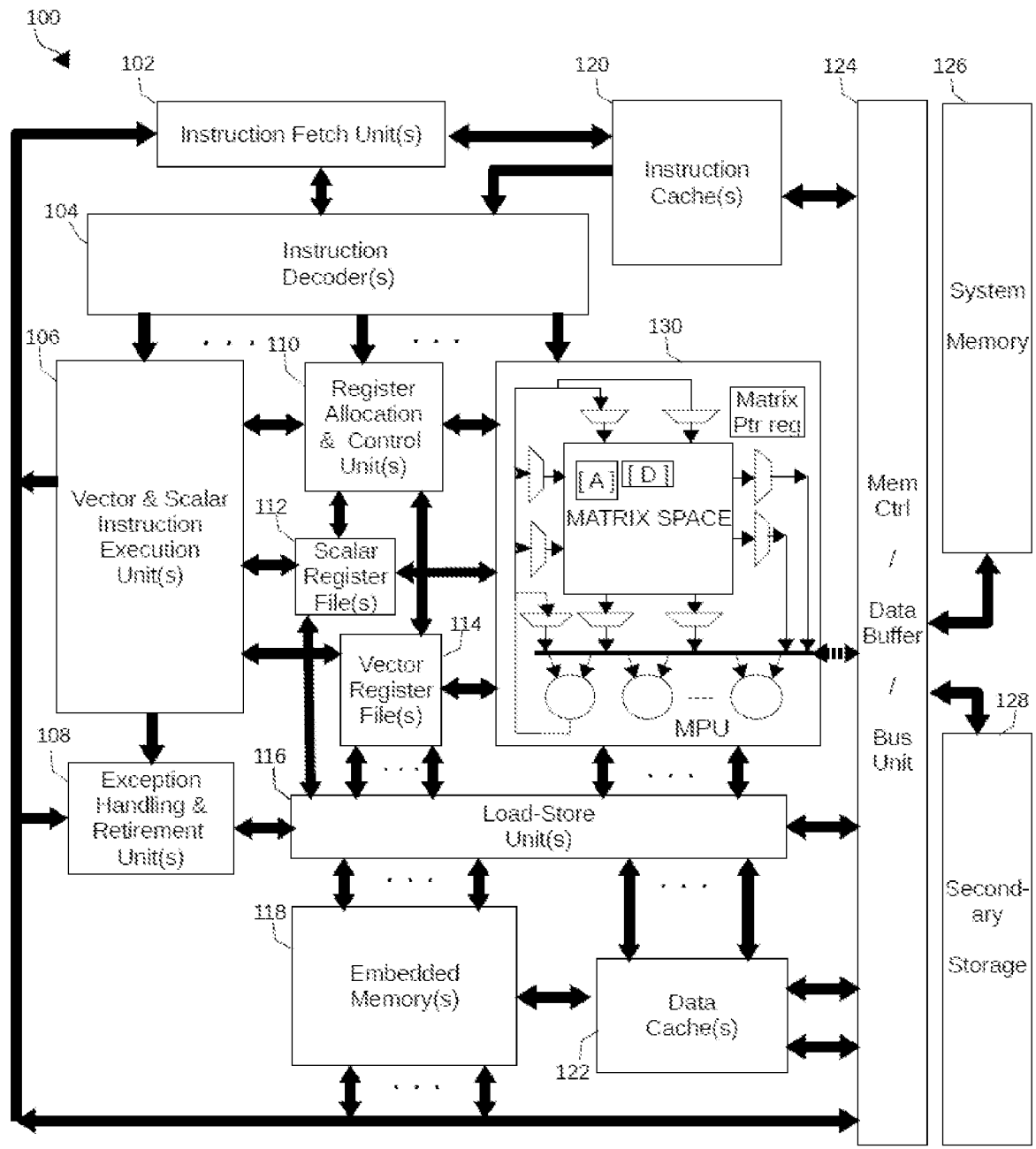
FIG. 1 illustrates an exemplary embodiment of a computing machine using a Matrix Space.

FIG. 1 shows one preferred embodiment of a computing machine 100 for matrix and array processing. The computing machine 100 comprises one or more instruction fetch unit(s) 102 to fetch and sequence instructions from the instruction cache 120 and/or a main memory that may comprise a system memory 126 and/or an embedded Memory 118. The computing machine 100 also comprises one or more instruction decoder(s) 104. In some embodiments the instruction decoder (s) 104 comprises the logic for a computer-implemented instruction set for matrix and array computing. The computing machine further comprises one or more vector and scalar instruction execution unit(s) 106, one or more register allocation unit(s) 110, and one or more matrix processing units (MPU(s)) 130 coupled to the instruction decoder(s) 104. In some embodiments one or more machine instructions of the computer-implemented instruction set are presented by the instruction fetch unit(s) 102 to the instruction decoder(s) 104 that decode/interpret the machine instructions using the logic for the computer implemented instruction set and present them to the vector and scalar instruction execution unit(s) 106, and/or the register allocation and control unit(s) 110, and/or the MPU(s) 130. The computing machine 100 further comprises one or more scalar register file(s) 112 and one or more vector register file(s) 114. In some embodiments the scalar register file(s) comprise general purpose and/or integer register file(s), and/or fixed point register file(s), and or pointer register file(s), and/or floating-point register file(s), and or application register file(s), and or control and status register file(s) and/or any other special register file(s) needed by the machine embodiment, and are not limited to these. In some embodiments the vector register file(s) 114 comprise integer or floating point vector register file(s) and/or integer and/or floating point vector register(s). In some embodiments the register allocation and control unit(s) 110 configures and controls selection and access for reading, writing, presetting, and/or clearing data in the scalar and vector register files 112 and 114. In some embodiments the data is provided to and/or received from the vector and scalar instruction execution unit(s) 106 which comprise execution logic implementing various arithmetic, logic, comparison, transport, bit-manipulation, word-manipulation, string manipulation, vector manipulation and other operators. In some embodiments the computing machine 100 further comprises one or more exception handling and retirement unit(s) 108 to handle interrupts, fault, traps, aborts, or any other forms of exceptions of any kind that may occur during program execution and to retire machine instructions of a program in an orderly fashion. Some embodiments of computing machine 100 further comprises data cache(s) 122 coupled to, and controlled and configured by one or more memory controller(s) 124 and one or more load-store unit(s) 116. The memory controller(s) 124 also controls and configures the main memory (comprising embedded memory(s) 118, the system memory 126 and any other memory not limited to graphics memory, display memory and others). The load-store unit(s) 116 may take commands from the vector and scalar execution unit(s) 106 and/or memory controller(s) 124 and/or the MPU(s) 130 to store and/or load data to and from, the data cache(s) 122, the embedded memory(s) 118, system memory(s) 126, and/or any of the main memory(s). In some embodiments the memory controller(s) 124 may further comprise one or more data buffers along with control logic, a system interface and/or a system bus logic also. In some embodiments one or more secondary storage entities 128 of any kind may be coupled to the control logic and/or the system interface in the memory controller(s) 124. In some embodiments the one or more MPU(s) 130 may each comprise one or more Matrix Space(s), one or more matrix pointer register(s), one or more ports coupled to the Matrix Space(s), one or more execution units/matrix & array execution units, control logic to configure and control matrix operations, and data path to transport data within and outside the MPU(s) as shown in FIG. 1. In some embodiments the MPU(s) are not controlled by the memory controller(s) 124 but may send data and receive data to and from the data buffers in the memory controller(s) 124. In some other embodiments the MPU(s) may be loosely controlled by the memory controller(s) 124 for the purpose of exchanging data.

Matrix and Array Processing

Figure 2A:
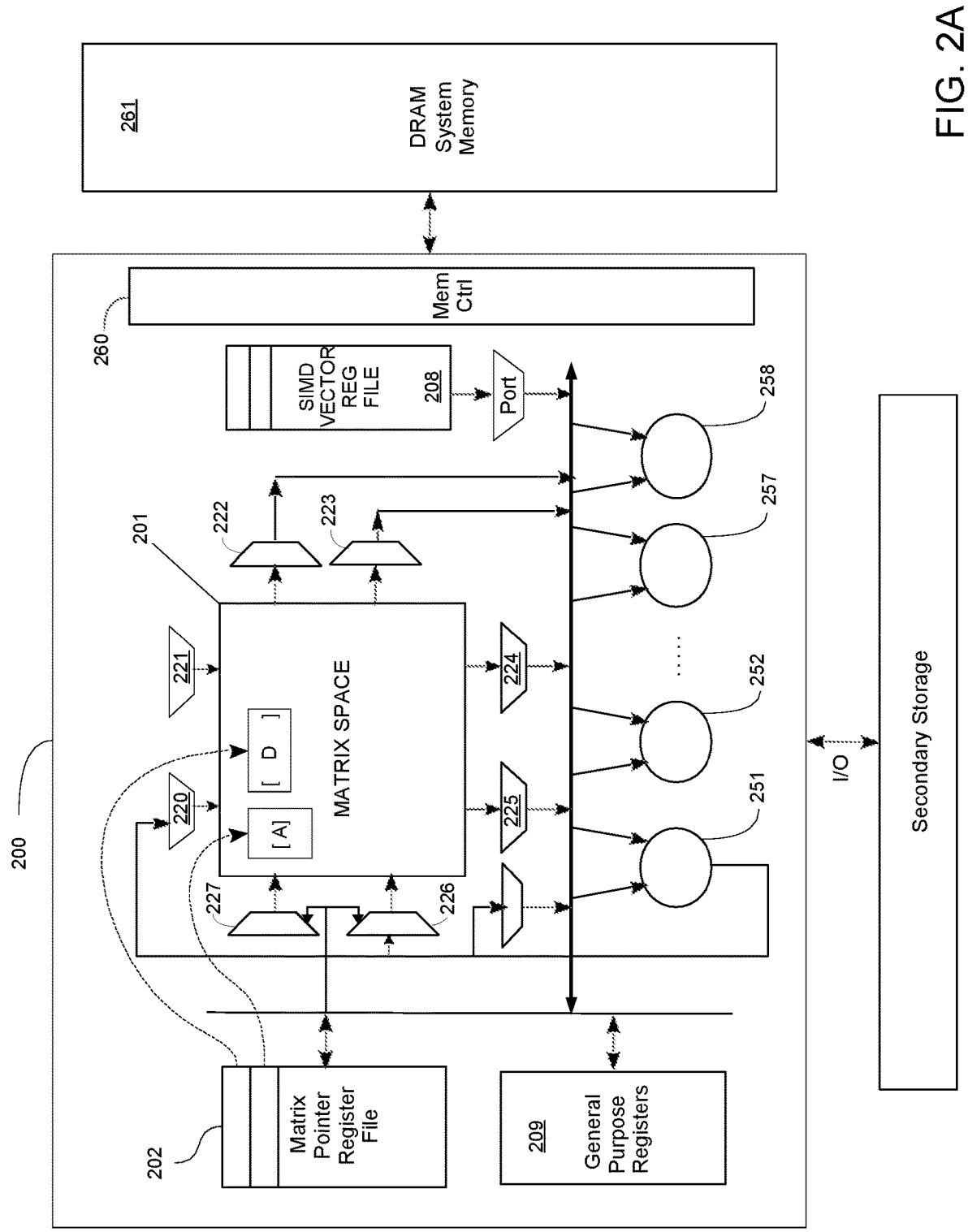
FIG. 2A illustrates a computing processor comprising a Matrix Processing Unit that comprises a Matrix Space and a matrix pointer register file in accordance with some embodiments.

Referring now to FIG. 2A, some embodiments of a computing processor 200 comprising a Matrix Processing Unit (MPU) are illustrated. In some embodiments, the matrix processing unit may comprise a Matrix Space 201 with ports 220, 221, 222, 223, 224, 225, 226 and 227, a matrix pointer register file 202, and a set of matrix execution units comprising 251, 252 through 257 and 258. In some embodiments, the Matrix Space comprises a specialized RAM (as mentioned earlier in the Brief Summary of the Invention) that may be accessed by its rows, as well as, by its columns, or by both rows and columns in two dimensions X and Y, separately or concurrently, to read, write or manipulate matrix (includes vectors also) and array data by their rows or by their columns, or both. In some embodiments, the MPU may also work in conjunction with a vector (or a vector SIMD) register file 208 and/or scalar and/or general purpose register file (scalar register file) 209. In some embodiments as shown in FIG. 2A, the MPU may receive data from a system memory (DRAM in some embodiments) 261, and/or some other tightly coupled, and/or loosely coupled memories, and/or embedded memories (not shown) using a memory controller 260. These memories (system memory, embedded memories, tightly or loosely coupled memories) configured and controlled by memory controller 260 are henceforth called "main memory" and are distinguished from a Matrix Space in this disclosure. The program instructions for matrix computing may reside in the system memory 261 and/or in a main memory, which are accessed and decoded in computing processor 200 and used to control various logic entities comprising the Matrix Space 201, matrix register file 202, ports 220 through 227, vector register file 208 (with its ports), scalar register file 209 and matrix execution units 251, 252 through 258. Data may be fetched from system memory 261 and/or a main memory into the Matrix Space 201 in accordance with the configuration provided in matrix register file 202 using matrix load instructions (to be disclosed in a latter section). Matrix and array computations may be conducted using matrix and array instructions with the data in the Matrix Space 201, and/or in scalar register file 209, and/or in vector register file 208.

In some aspects, regions of a Matrix Space may be pre-allocated to predefined matrices, arrays, processes, process threads, data types, instruction sequences from a particular customer (or user/owner of some data/process—henceforth "customer"), or to a single thread of instructions, or even different virtual machines, and host and various guest operating systems, as non-limiting examples. In some aspects, the MPU may run an algorithm to determine where to put specific data based on user-friendly coding instructions and security considerations including ownership. The MPU may run off predefined criteria, such as word size or data type, as nonlimiting examples.

In some implementations, this may allow the MPU to make better and more efficient use of a Matrix Space. This may also allow the MPU to have more overall space. In some aspects, the process shown in the Matrix Space may also be stride-less in order for the MPU to run at maximum efficiency, since the Matrix Space may be accessed by rows and/or by columns, and by both rows and columns concurrently, when necessary. In contrast to using strides to identify an adequate size in the Matrix Space on an as-needed basis, the present disclosure pre-allocates space (called matrix allocation, henceforth "allocation") within regions in a Matrix Space as configured by matrix pointer registers in various embodiments. In some aspects, the Matrix Space may hold one or more matrices, and/or arrays and/or vectors comprising data in a manner configured by one or more matrix regions and matrix pointer registers. In some embodiments, a specific customer, or program thread, or process may have a pre-allocated space where the same pre-allocated space is used each time instructions are run for that specific customer or program thread, or process.

There may be a noticeable space optimization in the Matrix Space using pre-allocation instead of using stride. In some implementations, the overlap may be based on pre-defined, acceptable, or determined similarities, such as by data type, program type, or customer. For example, in some embodiments different data sets may have overlapping pre-allocated space for the same customer, or process thread, or process. In some embodiments, the pre-allocated space may comprise a 16-bit space, which may allow for data sets of 4, 8, and 16 bits. The determination may be manually selected by the user, or there may be an auto determination from the MPU based on the type of input and which organizational tool may best fit the need of the MPU.

Figure 2B:
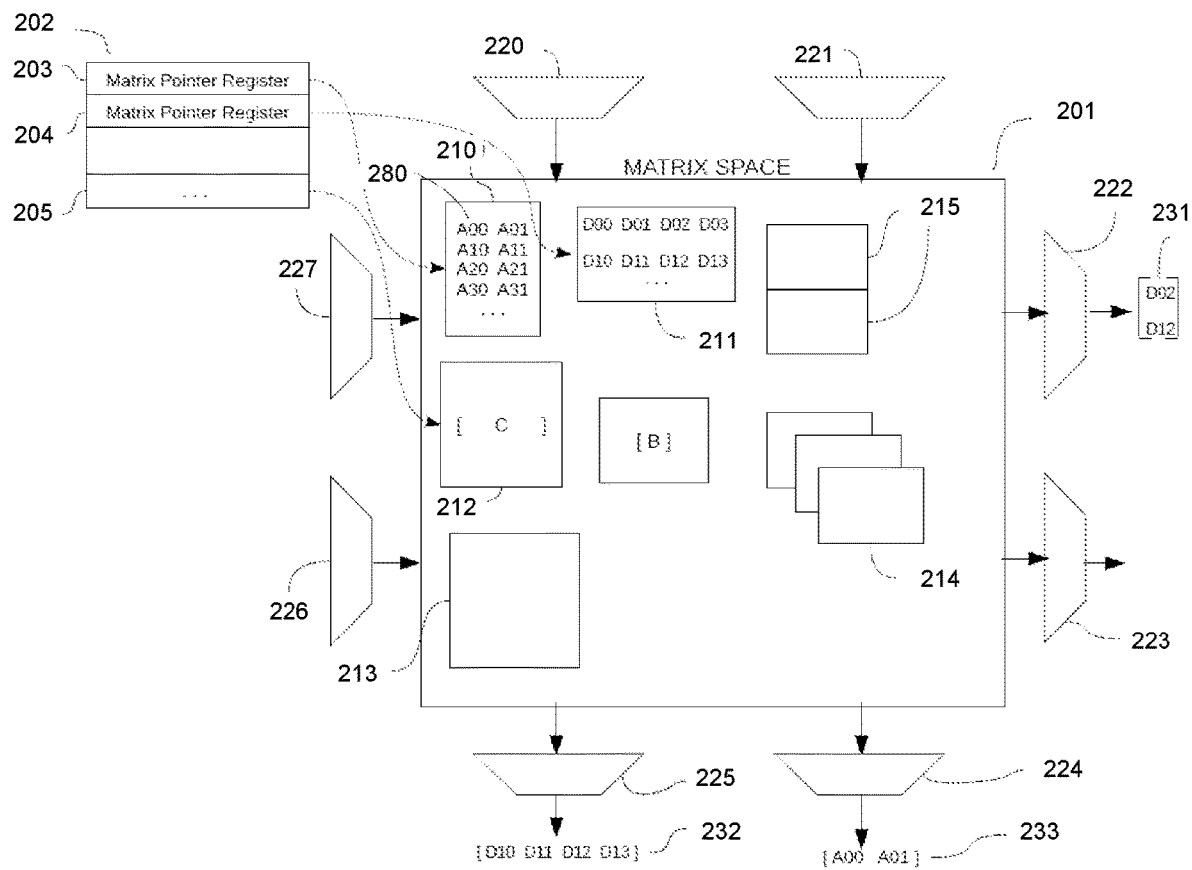
FIG. 2B is a functional diagram of a Matrix Processing Unit comprising a Matrix Space with row and column ports, holding matrices and arrays addressed by associated matrix pointer registers inside a processing unit in operation in accordance with some embodiments.

Referring now to FIG. 2B, in some embodiments a computing processor 200, the computing processor 200 may use different mechanisms inside a Matrix Processing unit. In some aspects, inside a computing processor 200, one or more embedded (special Random Access Memory (RAM) like) storages such as 201 called Matrix Space may be used to hold a plurality of Matrices (Matrixes) A 210, B, D 211, C 212, 213, Matroids 214 (arrays of higher than 2 dimensions used in mathematics, physics and engineering) or multi-dimensional (numerical or non-numerical) Arrays 215 for computation inside a processing unit as configured by contents of one or more matrix pointer register files such as 202. Matrix A 210 is configured and addressed using matrix pointer register 203 under the control of a matrix instruction, and any individual row of matrix A such as row 233 holding [A00 A01] may be accessed on a port 224. Similarly, in some embodiments, the matrix D may be accessed on port 225 by its rows such as 232 and by its columns 231 on port 222. This may be done simultaneously/concurrently or separately. In this context a matrix instruction is simply a machine instruction which may access a Matrix Space for some functionality. In some embodiments, in non-limiting examples, it may also be possible to access sub-matrices, transposed matrices, diagonals, triangular and multi-diagonal portions of a matrix among others, for computation, manipulation and storage. The Matrix Space may comprise a RAM that may be accessed by its rows as well as by its columns in two dimensions X and Y in a single semiconductor chip. In some implementations, the RAM may be accessed another way if programmed to do so by the user or the customer for preference purposes. In some aspects, the Matrix Space RAM may be accessed in 3 dimensions X, Y, Z, where the Matrix Space RAM may be implemented over semiconductor chips that may be stacked to create 3-Dimensional chips. In some embodiments, a 3-Dimensional Matrix Space with Ports in all 3 dimensions may provide access to Matroids and Arrays (held in 3-D) in 3-Dimensions.

Figure 2C:
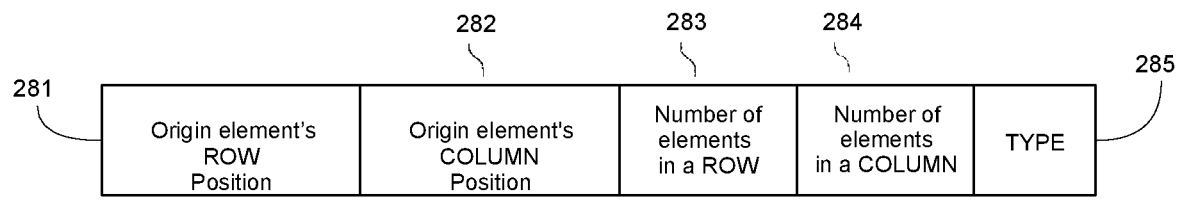
FIG. 2C illustrates fields of a matrix pointer register in some embodiments.

Referring to FIG. 2C, in some embodiments, the fields of a Matrix Pointer Register such as 203 (FIG. 2B) are as illustrated. These comprise a row position (henceforth "row address") 281 of an origin element of a matrix, a column position (henceforth "column address") 282 of an origin element of a matrix, number of elements in a row (henceforth "row size") 283 (equal to the number of columns of a matrix "#cols"), number of elements in a column (henceforth "col size") 284 (equal to the number of rows of a matrix "#rows"), and type of elements in the array (henceforth "Type") 285. Here the row address 281 and column address 282 (henceforth jointly written as "row, col address (281, 282)") jointly provide the allocation location (location of an origin element of a matrix or array) inside the Matrix Space. Also, the row size, column size (283, 284) jointly provide the allocation size for a matrix or array inside the Matrix Space. In some embodiments, the Type 285 may identify the elements of a matrix, vector or array as nibbles bytes, short integers, integer words, 32-bit integers, long integers, 64-bit integers, long long integers, pointers (to a memory location), half precision floating point numbers, single precision floating points, double precision floating points, extended and quad precision floating point numbers, ordered pairs (a collection of 2 values) of any integer types, ordered pairs of any floating point types, ordered quads (a collection of 4 values) of any integer types, ordered quads of any floating point types, triads of integer types, triads (a collection of 3 numbers) of floating point types, ordered quads or triads or pairs of nibbles or bytes, untyped values with no designated type which may comprise collections of a user-defined number of bits each, and any other types not limited to the aforementioned, as used in an implementation. In case of 3-D matrix spaces, besides rows and columns addresses, the third set of address are called tower address (or layer addresses). In such cases the matrix pointer register can be extended to also include a field for a tower address (layer address) of the origin element and a field to hold the number of layers in the matroid or 3-D matrix.

Accessing and Computing with a Matrix in a Matrix Space Using Matrix Pointer Registers Referring to FIGS. 2A-2C, in some embodiments, a set of Matrix Pointer registers 202 along with a subset of instructions called matrix instructions in a computer-implemented instruction set may be used to access these matrix and array entities from a Matrix Space 201 in a computing processor 200. In some embodiments, the matrix instructions may execute array or matrix operations for matrix arithmetic inside the computing processor 200 using a plurality of execution units 251, 252-257, 258, in parallel. In one example, in some embodiments, some Matrix A may be stored in an allocation 210 inside the Matrix Space 201 inside a computing processor 200, and may be pointed to by the contents of a Matrix Pointer register 203. In some embodiments the fields of the Matrix Pointer register 203 are as shown in FIG. 2C. Referring to FIGS. 2A-2C, in some embodiments during operation, a Matrix Pointer register 203 whose contents point to a Matrix A at allocation 210 may hold a row address 281 and a column address 282 of the location of a specific element called the origin 280 (typically a corner location like A00 of matrix A) of a allocation 210 in the Matrix Space; it may also hold the row size (number of row elements) 283 and column size (number of column elements) 284 of the matrix, and its Type 285. In some aspects, the addresses of two diagonally opposite corners (like the top-left and bottom-right corners) of the corresponding matrices (matrixes) inside a Matrix Space may be obtained using the fields 281, 282, 283, 284 and interpreted along with the Type 285 of the elements of matrix A, and similarly for a matrix D in allocation 211. Based on the operation type, the rows or columns (or both) of matrix A and matrix D may be read out one or more at a time, either separately, or concurrently, and used in computing the result. In some embodiments, a row 233 of matrix A with contents [A00 A01] may be read out on port 224. At the same time (or at a different times) a column 231 with contents [D02 D12]$^T$ of matrix D may be read out on port 222, and row 232 with contents [D10 D11 D12 D13] of matrix D residing at allocation 211 may be read out on port 225. The rows and columns of D may be read out at the same time or at separate times in various embodiments.

In some aspects, a matrix or array in Matrix Space may be controlled, accessed, read out or written into by using the fields in a longer machine instruction with operands that provide the location, size and type of the said matrix or array, thereby not employing a matrix pointer register.

Referring to FIGS. 2A-2C, as an illustrative example, in some embodiments the result of a matrix operation may be computed using execution units such as 251 through 258, such as illustrated in FIG. 2A, and the result may be deposited into a Matrix C at allocation 212, as illustrated in FIG. 2B, at the location specified by contents of matrix pointer register 205, via the port 220 and/or port 227. The Type 285 of C may be updated into matrix pointer register 205 correctly based on the result produced by the instruction. In some aspects, where a computation may require additional matrices, vectors or scalar values, these may be read using appropriate methods and utilized in the computation or in the generation or storage of a result. The result(s) of an operation may be written into a matrix held inside the Matrix Space by row or by column (or both); a vector result may be written into a vector register, and/or a scalar result may be written into a regular scalar register, as specified by an instruction. The process of accessing or computing may be similar for an array comprised of non-numeric elements held in the Matrix Space.

Structure of the Matrix Space

Figure 3:
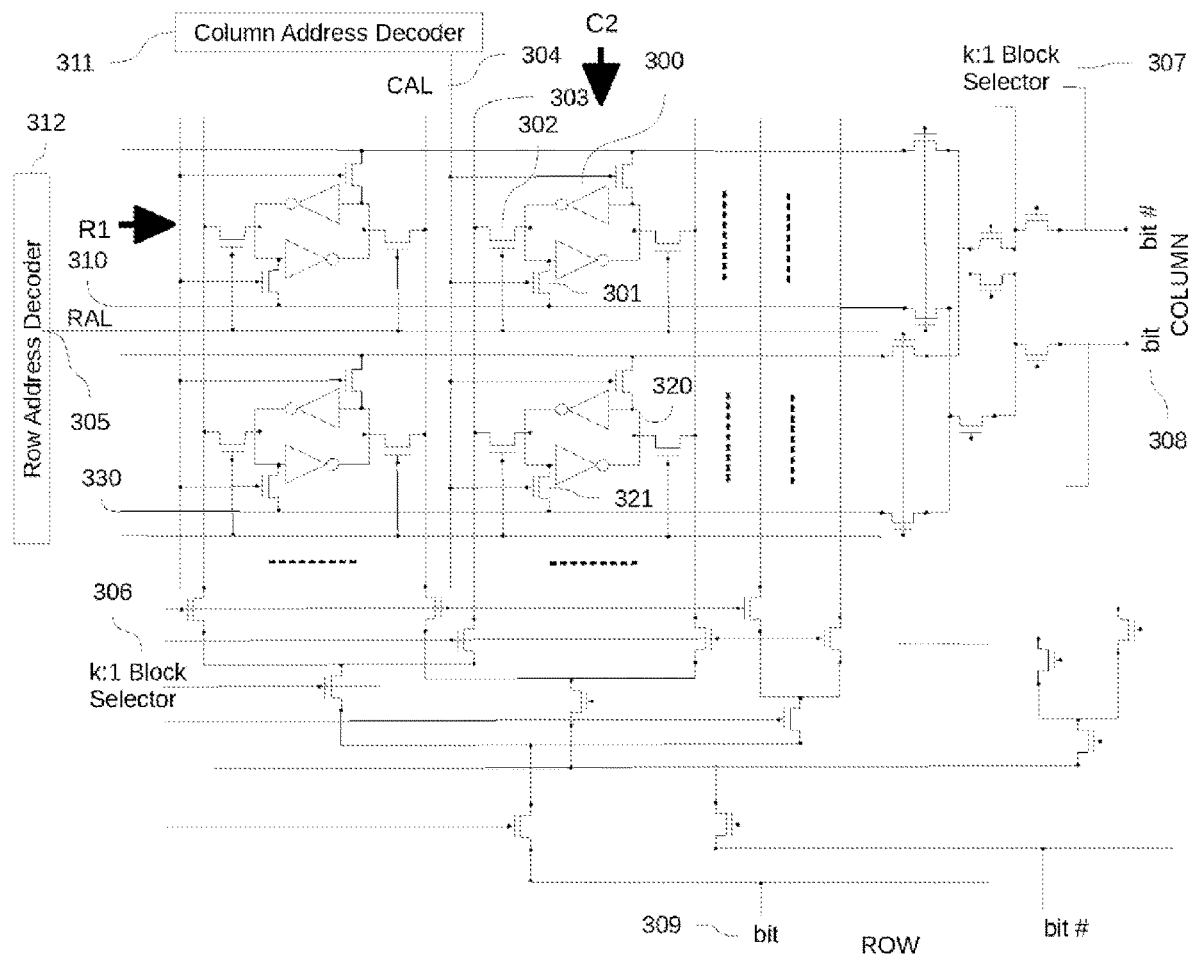
FIG. 3 is one embodiment of a memory array accessible by columns and by rows along with row and column selectors and address decoders.

FIG. 3 shows the block diagram of one embodiment of a matrix space. The matrix space has several rows of storage cells. However, unlike prior art each storage cell can be accessed along the column or row of the matrix of cells. A matrix space has bit lines along both rows and columns of the matrix of cells as seen in the embodiment shown in FIG. 3. Likewise, unlike a register file or memory block, a matrix space also has controlling word lines along both rows and columns of the matrix of cells. This allows read and write access to an entire row of storage elements and also to an entire column of storage elements concurrently. Thus cells in matrix space storage are addressable and data stored is accessible by rows and by columns.

It is easy to understand that any rotation, translation or reflection of a matrix space is also a matrix space. It is also easy to understand that additional circuitry can be added to cells in a matrix space to clear the value in a cell to 0 or set to 1 much like for a generic memory or storage cell with preset or clear.

Accessing Rows and Columns of a Matrix stored in a Matrix Space

In one embodiment of the invention incorporating the matrix space shown in FIG. 3, the storage array can be accessed along its rows or along its columns, simultaneously. The elements of a matrix or array stored in cells [300] inside this matrix space accessible simultaneously or separately along two different sets of ports [308] and [309]. The matrix space uses a plurality of word-lines [305] called row address lines (abbreviated as RALs) and another plurality of word lines [304] called column address lines (abbreviated as CALs) in the perpendicular direction to the length of RALs [305]. RALs like [305] are coupled to cells in individual rows of the matrix space while CALs like [304] are coupled to cells in individual columns of the matrix space. Each individual RAL controls a plurality of elements of a row of a portion or block or bank of a matrix space. To access a row R1 of a block in the matrix space, an address is presented to a row address decoder [312] to select the corresponding RAL [305] which is coupled to cells like [300] in that row R1. These cells like [300] are selected and read on to a bus of row bit lines (abbreviated as RBLs) [303] via coupling Field Effect Transistors (FETs) [302] as shown in the embodiment in FIG. 3. The plurality of binary values that appear on the bus of row bit lines [303] pass through a block selecting decoder [306] and appear on a port [309] of the matrix space.

Analogously, in the embodiment shown in FIG. 3, an individual CAL [304] controls individual FETs like [301] that couple a column of storage cells [300] and [320] to corresponding column bit lines such as [310], [330], respectively, there by controlling the access to the corresponding column C2 of the matrix or array inside a block of a matrix space. To access a column C2 of the Matrix Space containing the cell [300] an address is presented to a column address decoder [311] to select a corresponding CAL [304] so that the values in the corresponding coupled storage cells [300] and [320] in that column are selected to be read on to a bus of column bit lines (abbreviated as CBLs) [310] and [330] via coupling FETs [301], [321]. The values on CBL bus formed by [310], [330] and such, appear on the port [308] of the matrix space when selected by a block selecting decoder [307] in the embodiment in FIG. 3.

To write values into a column C2 of cells including cells [300, 320], the column bit lines [310], [330] and such, are forced with the corresponding bit values to be written into the column C2. Concurrently the CAL [304] is selected by presenting the column address to column address decoder [311] which turns on the coupled FETs [301], [321] and such (and their partners on the complementary column bit #lines, if present). Due to the superior drive of the buffers (not shown) driving the bit lines the values in the storage cells take the driven values and complete the writing process. An analogous process to the one above can be used to write values to a row R1 of cells using the corresponding row bit lines and the RAL [305] selecting the row.

Storing and Accessing Matrix or Array Holding 4-Bit (Nibble) Values

It may be noted that the values read as rows or columns via individual bit lines from the matrix or array stored in the portion of matrix space in the embodiment shown in FIG. 3 are all individual bits. If a row of bits read on port [309] using RAL [305] represent an integer value v1 with element [300] contributing a single bit among those comprising v1 then when a column of bits are read on port [309] using CAL [304] coupled to cell [300] contributing a single bit among those comprising value v2, the rest of the bits in v2 will not be related to value v1 in any way. Here v2 is not equal to v1. Hence, it becomes clear that any matrix or array stored in the embodiment of FIG. 3 without further arrangement is simply a matrix or array of bits.

It is commonly understood that a byte is a generic 8-bit binary value and a nibble is a generic 4-bit binary value. A short word typically comprises of 16-bit values and is used as a short integer or a wide character. A word is a generic term for a binary value longer than a byte. An integer is typically represented as a 32-bit or 64-bit value, while a long integer is typically a 64-bit value. Besides these, binary values stored in register cells may represent ordered pairs, a quad (or collection of four) of binary values, complex numbers or floating point numbers of various kinds and so on.

In order to store a nibble, a byte, a short word, or any binary word in the embodiment shown in FIG. 3, these entities must be reconstructed out of bit matrices after reading out bits on row or column ports [309], [308] and such using a network of multiplexors and de-multiplexors.

In case of 3-D matrix spaces, besides row and column address lines, the third set of address lines are called tower address lines (or layer address lines). Analogously, besides row bit lines and column bit lines, the third set of bit lines (or bit lines in the third dimension) are called tower bit lines that transfer values across layers of 2-Dimensional slices of the matrix space where the tower address lines (layer address lines) would select the layer of the tower of slices of the matrix space.

Figure 4:
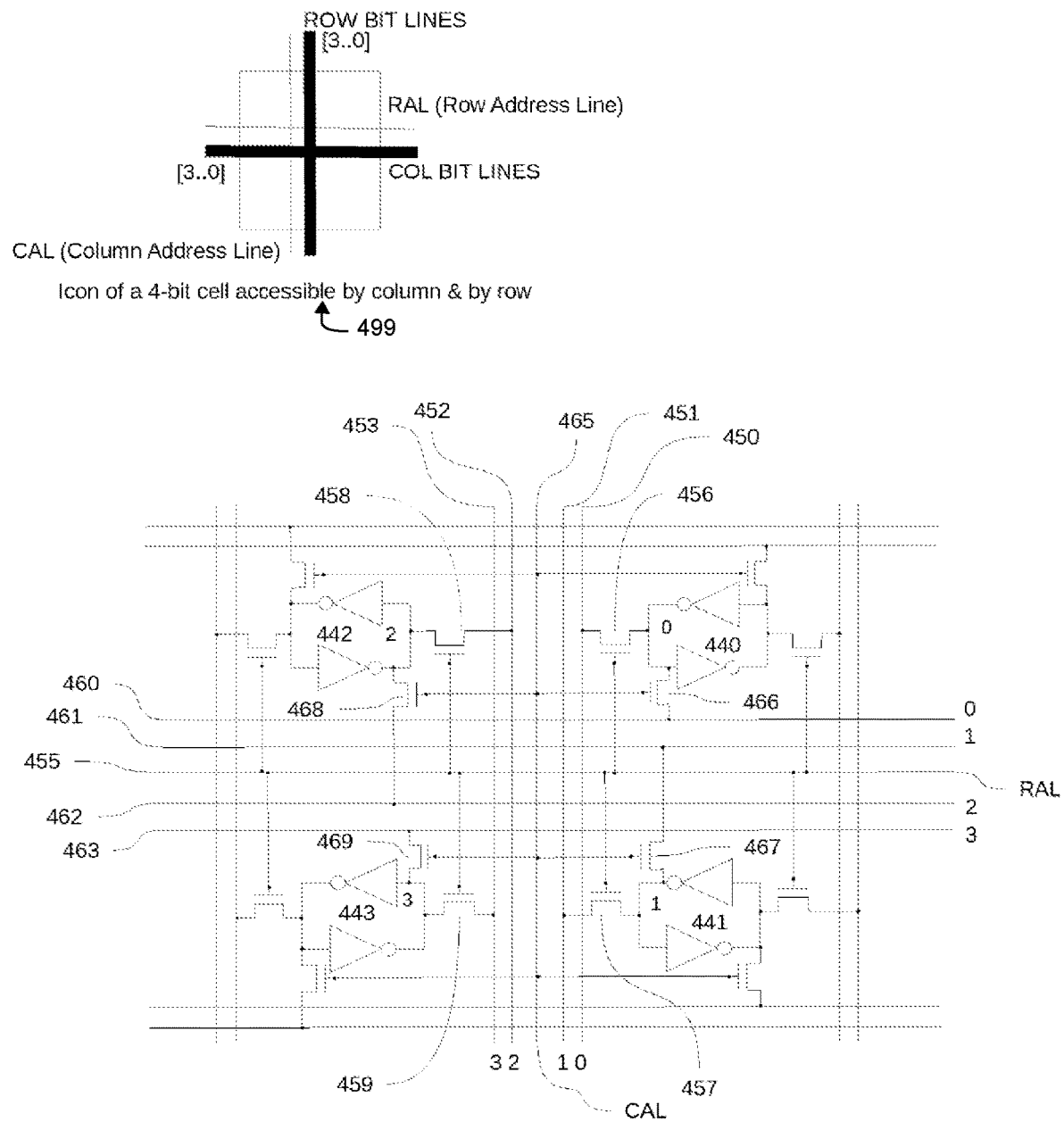
FIG. 4 shows one embodiment of a 4-bit cell addressable and accessible by rows and by columns as a 4-bit value.

Alternately, one embodiment shown in FIG. 4 shows an arrangement where four bits, typically adjacent bits, stored in four storage elements form a 4-bit nibble cell or 4-bit quad cell which can be accessed easily both along a column or a row. In this embodiment the matrix space comprises of these nibble cells which are a quad of 4-bits as in the figure. This allows a 4-bit value, say n1, to be stored in four storage elements [443, 442, 441, 440], one bit per element. In the embodiment of FIG. 4, to read out the nibble stored in [443, 442, 441, 440] on row bit lines (vertical bit lines in figure) [453, 452, 451, 450] respectively, a 1-hot decoded address is presented on a row address line [455] which turns on coupling FETs [456, 457, 458, 459] through which the stored values appear on the row bit lines. To read the same value n1 out from the elements [443, 442, 441, 440] on to column bit lines (horizontal bit lines in FIG. 4), a 1-hot decoded address is placed on a column address line [465] in the embodiment of FIG. 4. This turns on the coupling FETs [466, 467, 468, 469] through which the values from the storage element are driven on to column bit lines [463, 462, 461, 460] respectively. An icon [499] shown in FIG. 4 may be used to succinctly represent embodiments of such quad of storage elements as described previously which we call a nibble cell.

Figure 5:
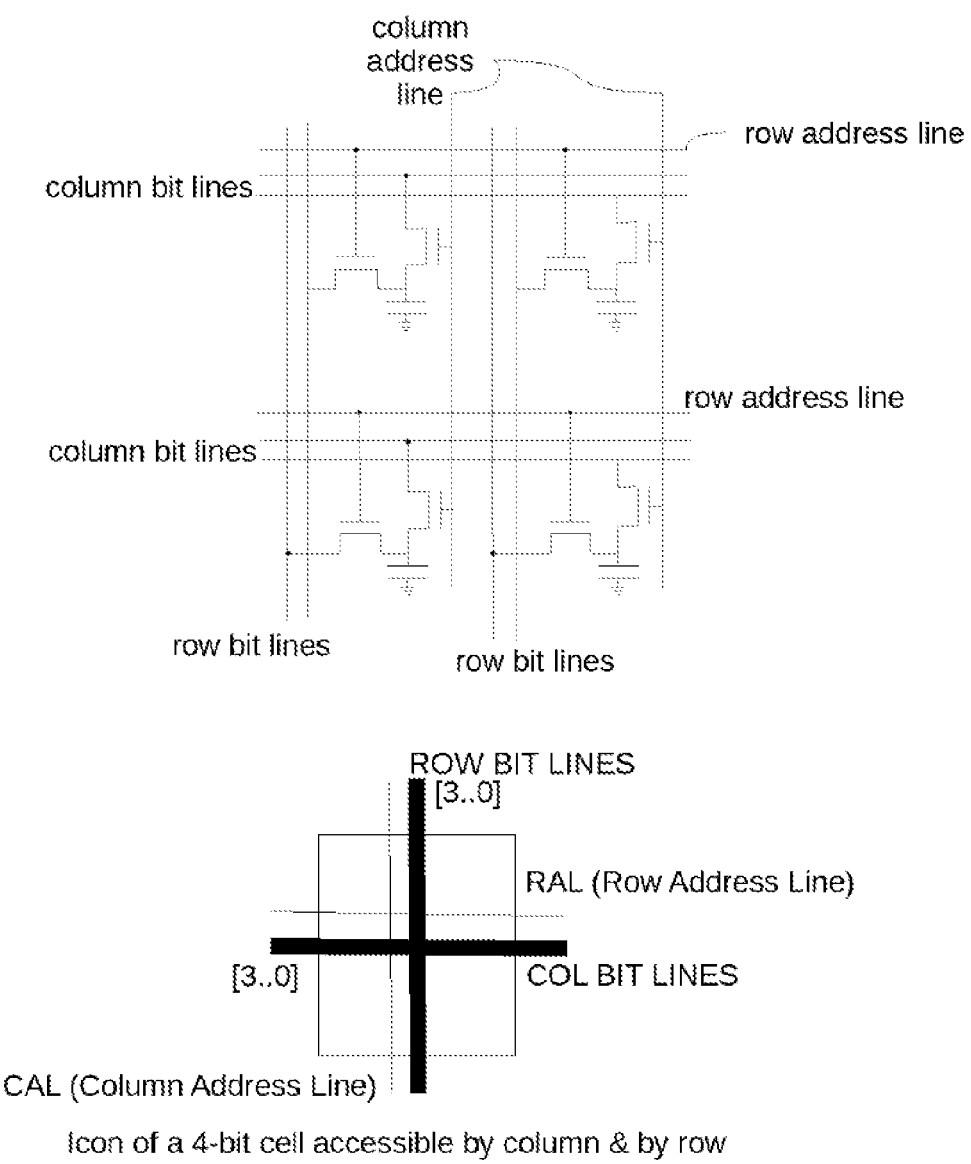
FIG. 5 shows a schematic of one embodiment of a 4-bit cell made of dynamic or non-volatile storage cells which are addressable and accessible by rows and by columns as a 4-bit value.

Blocks of nibble cells, an example of which was described in FIG. 4, in various embodiments may be used along with block selection decoders such as [306] and [307] shown in FIG. 3 to construct multi-block array spaces holding nibble matrices and arrays. An arranged collection of these would form a matrix space capable of holding integer or longer binary values. FIG. 5 shows one embodiment of a nibble cell that uses dynamic memory or non-volatile memory elements for storage. Without loss of generality it is well understood from the embodiments shown in FIGS. 4 & 5 that the storage element in a nibble cell may be a static RAM cell, a dynamic RAM cell or a non-volatile memory cell and the 4-bit nibble cell architecture uses the same elements of the invention like the row and column bit lines and row and column address lines.

Nibble Cell Made of Flip-Flops or Latches

Figure 7:
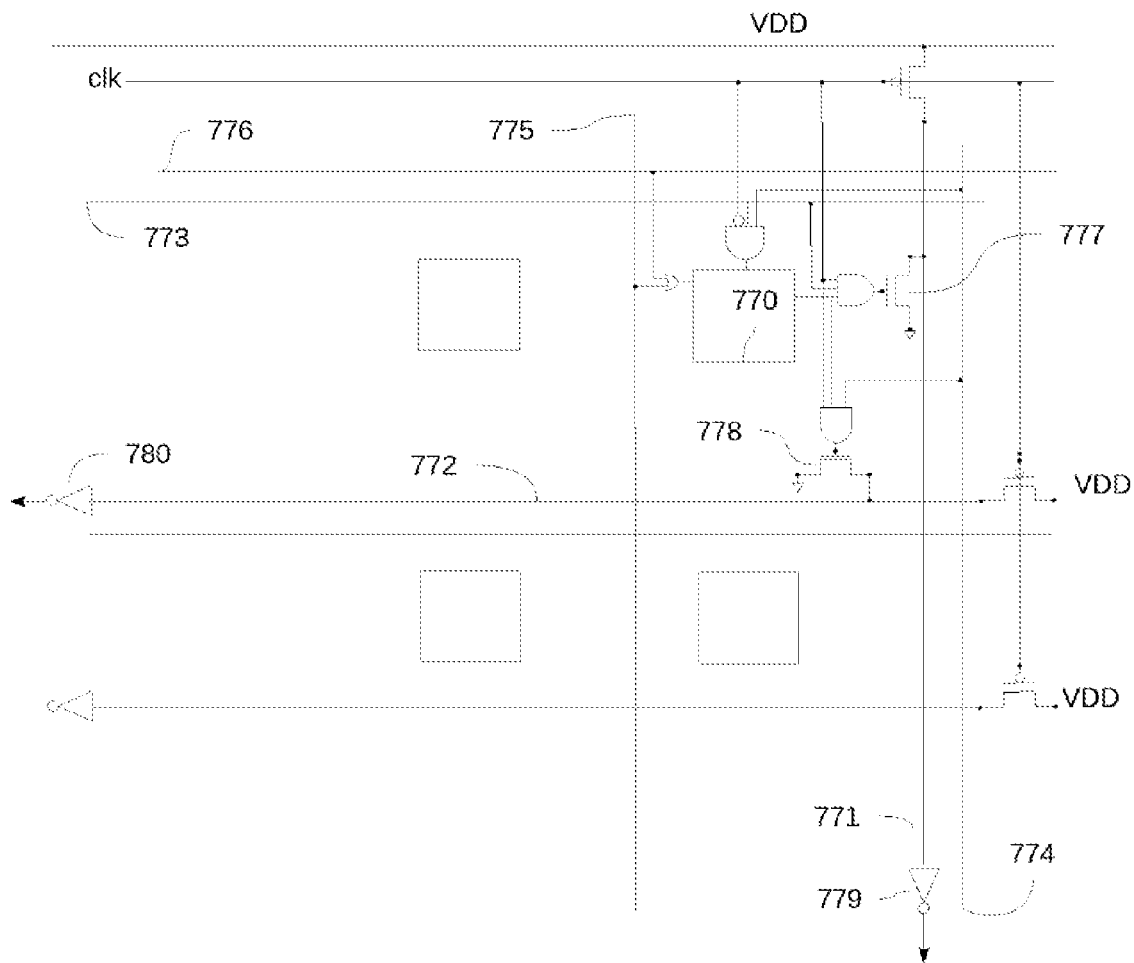
FIG. 7 shows an outline of a column and row accessible and addressable 4-bit (nibble) cell made of logic gates and latches in one embodiment.

A cell to hold a nibble value (4-bits) for matrix space for matrix computing can be made in a plurality of ways. As long as the nibble value in a storage element can be addressed, stored and accessed (written or read or possibly cleared) along the length of a row or along the length of a column of an array, it can be used to construct a larger array to hold nibbles, 16-bit shorts words or longer binary values. FIG. 7 shows one embodiment of a 4-bit nibble cell that uses flip-flops or latches, logic gates and single ended bit lines.

In one embodiment of the invention shown in FIG. 7, to read a 1 value from cell on to a row bit line [771], this bit-line is first pre-charged to a 1 or VDD during the pre-charge phase of the clock [clk] (pre-charge circuit not shown); then a row address line [773] is selected during the read phase of clock [clk] which causes the NMOS [777] of a NOR gate to pull down the bit line [771] which causes a 1 to be presented at the output of the inverter [779]. A 0 values in cell [770] when presented on the gate of [777] during the read phase of the clock [clk] does not turn it on and the pre-charged 1 (from the pre-charge phase) on the row bit line [771] is retained which drives inverter [779] to a 0.

To read a value on to the column bit lines [772], this bit-line is first pre-charged to a 1 or VDD during the pre-charge phase of the clock [clk] (pre-charge circuit not shown); the column address line [774] is selected during the read phase of clock [clk], which transfers the stored value from the cell [770] to the column bit lines [772] via the pull-down NMOS [778] of a NOR gate and appears at the output of the inverter [780]. To write a value to the cells from a row bit line [775], the corresponding row address line [773] is selected and the value is transferred to a storage element [770] during a write phase of clock [clk]. An analogous process is used to write a value to a storage element from a column bit lines [776] during write phase oc clock [clk] by selecting the column address line [774]. The two write bit lines [775] and [776] may be either multiplexed using the address word lines [773, 774] for generic use or simply combined using an OR gate, under certain mutual exclusion constraints to produce the value to be stored.

A Macro Cell for Storing and Accessing 16-Bit Short Word Values

A cell to hold a nibble value (or 4-bits) for matrix computing can be made in a plurality of ways. As long as nibble values in storage elements can be addressed, stored and accessed (written or read or possibly cleared) along the length of a row or along the length of a column of an array, they can be used to construct larger arrays to hold nibbles, bytes, short words or longer binary words.

Figure 6:
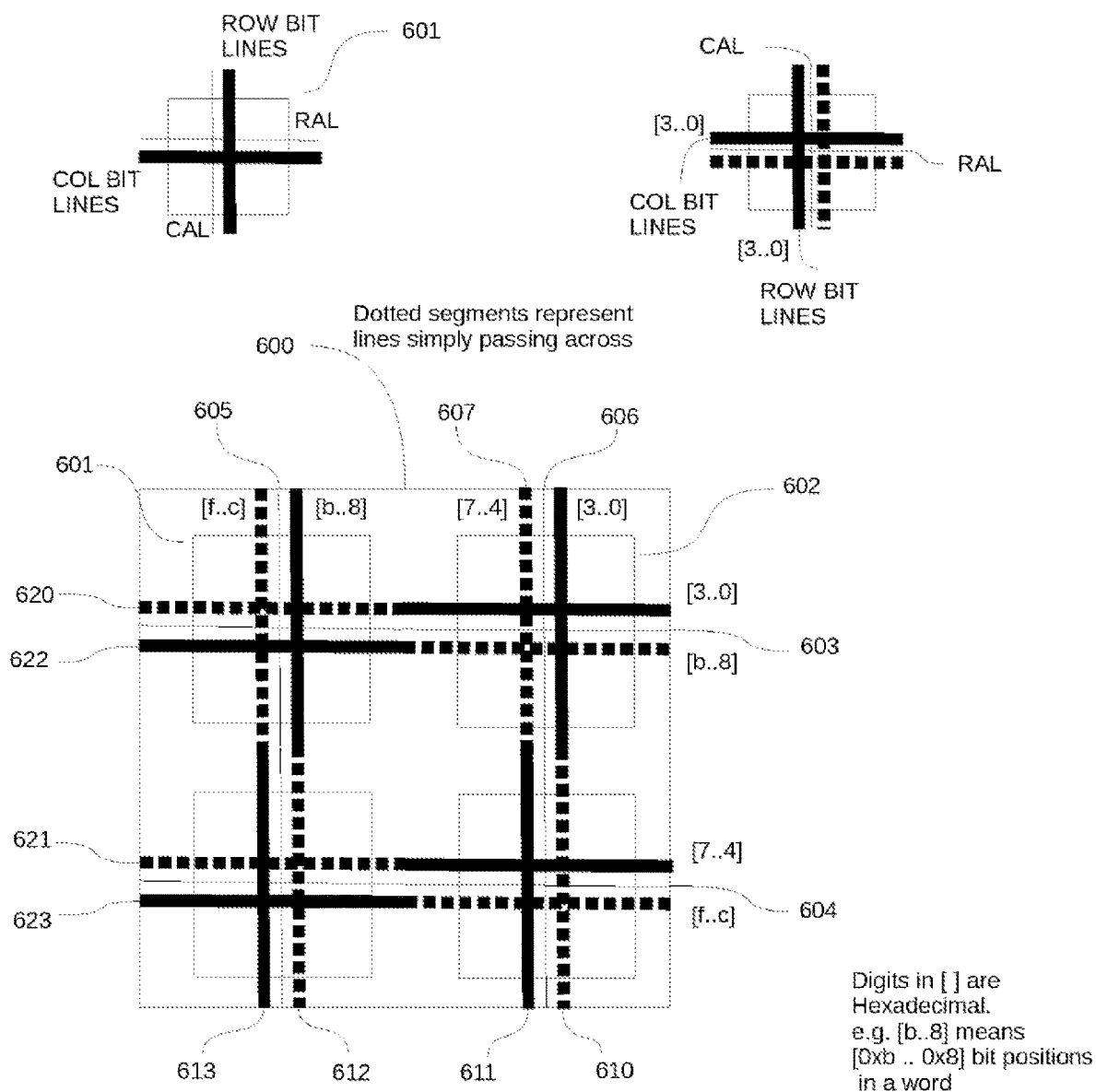
FIG. 6 shows a block diagram of one embodiment of a column & row addressable and accessible 16-bit word cell composed of 4-bit cells.

In one embodiment shown in FIG. 6, a macro cell [600] comprised of four nibble cells some embodiments of which are shown in FIGS. 4 & 5, is used to store 16-bit short binary words. In such a macro cell [600] a single nibble cell such as [601] holds 4 bits of a 16-bit short binary word. The wide dotted lines such as [607] in the FIG. 6 denote pass-through buses that make the arrangement more compact and organized; a bus such as [607] does not affect the logic of a cell such as [602] with which it is not directly coupled but across which it passes through. Buses [620], [621], [622], [623] carry bits 0 to 3 shown as [3 . . . 0], bits 4 to 7 shown as [7 . . . 4], bits 8 to 11 shown as [b . . . 8], and bits 12 to 15 shown as [f . . . c], respectively. Here, [b . . . 8] represents hexadecimals 0x8 through 0xb, while [f . . . c] represents hexadecimals 0xc through 0xf, and denote bit positions.

To understand the function of the embodiment shown in FIG. 6, let us suppose a short word v1 is stored in the macro cell shown. When a row address is decoded and the controlling row address lines (RAL) [603] and [604] are selected the coupled storage cell contents are read out on corresponding row bit lines (vertical bit lines in the FIG. 6) [610, 611, 612, 613] that form a row data bus. Concatenating the nibbles on the row data bus in the order [613.612.611.610]) gives the short word v1; here (.) denotes the concatenation operation.

Analogously, when a column address is decoded and the controlling column address lines (CAL) [605] and [606] are selected the contents in the coupled storage cells such as [601], [602], etc., are read out on to the corresponding column bit lines (horizontal bit lines in figure) that form the column data buses [620, 621, 622, 623]. Concatenating the nibbles on the column data buses in the order [623.622.621.620] gives the short word v1 stored in the macro cell.

Writing a short word value into the array via row data buses is as easy as placing a short value, say, v1 on the buses and selecting the controlling row address lines [603] & [604]. In an analogous process, a value v1 is driven on to the column data buses [620, 621, 622, 623] and selecting the controlling column address lines [605] & [606] stores v1 into the macro cell.

Column and Row Accessible and Addressable Array of Words

Figure 8:
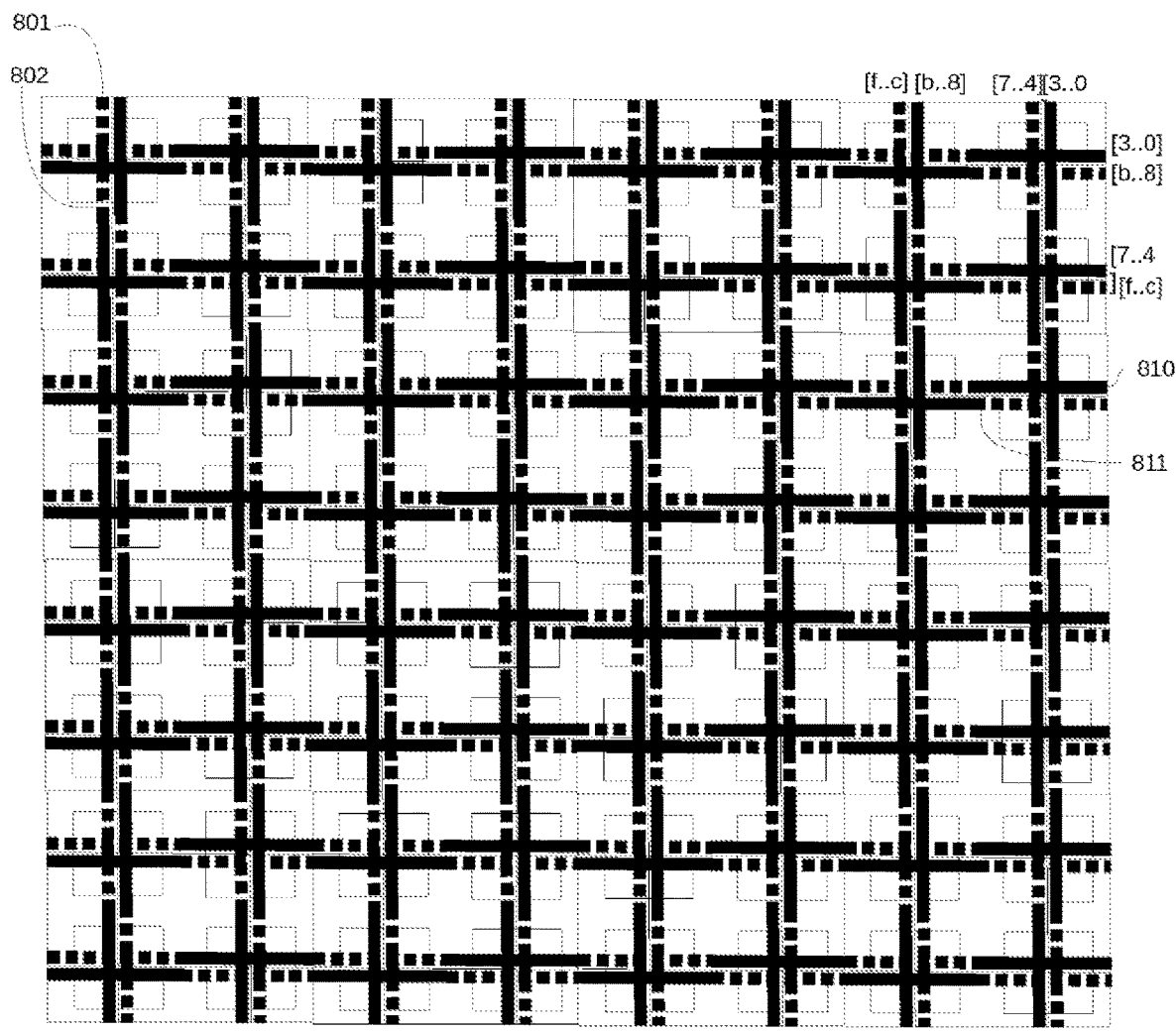
FIG. 8 has one embodiment of an array of 16-bit words accessible and addressable by columns and rows.

FIG. 8 shows one embodiment with an array of macro cells to store an array of short binary words. The row bit lines (vertical bit lines in FIG. 8) in row data buses [801, 802 and such] are coupled to form longer row bit lines; and the controlling row address lines are coupled along the corresponding rows. Analogously, as shown, column bit lines (horizontal bit lines in FIG. 8) in column data buses [810, 811 and such] are coupled to form longer column bit lines and the controlling column address lines are coupled along the corresponding columns. The two sets of pre-charge circuits coupled to column bit lines and to row bit lines, as well as the row and column address decoders coupled to row and column address lines are not shown in FIG. 8.

Alternate Design to Hold a Compact Array of Words

Figure 9:
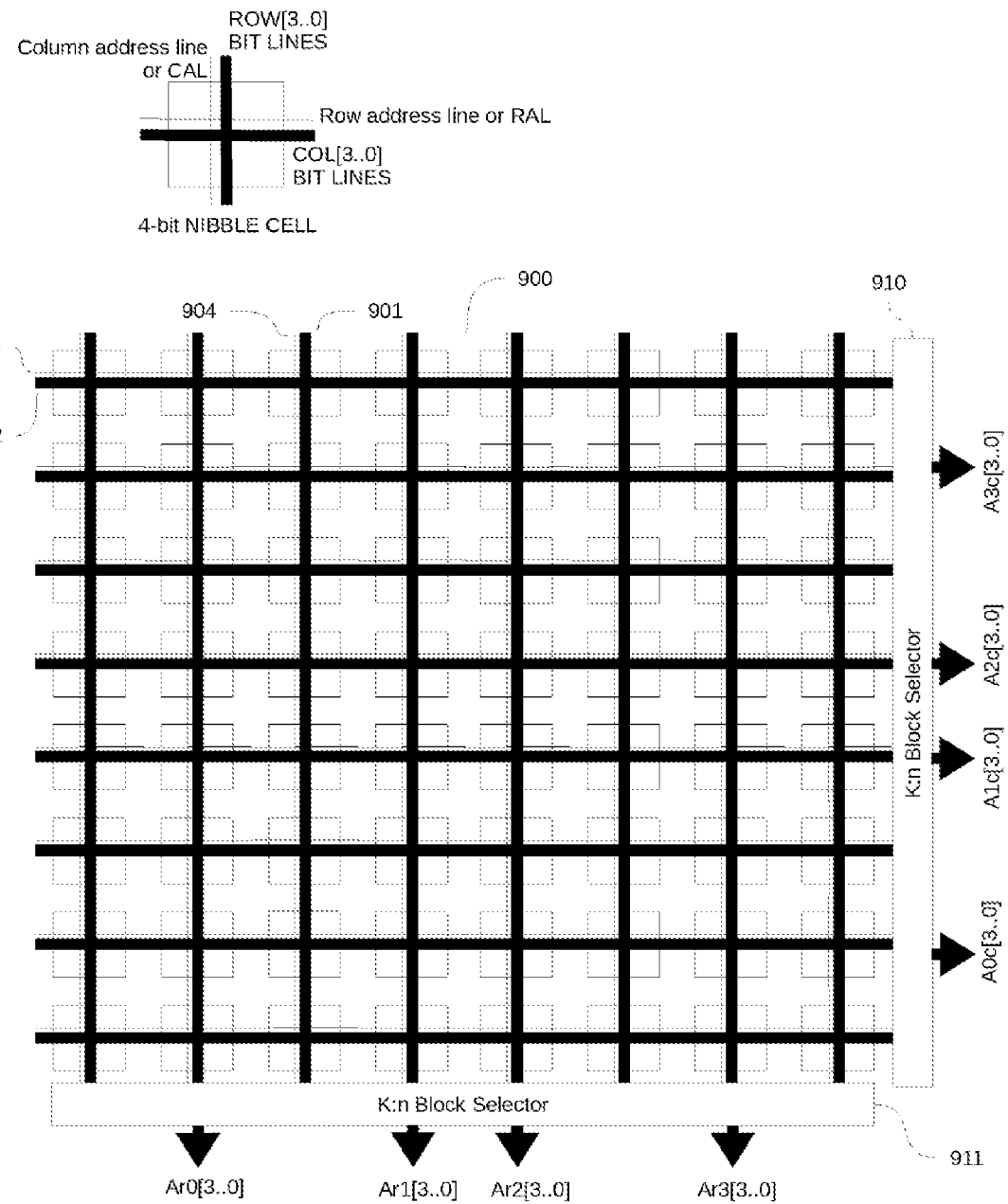
FIG. 9 shows one embodiment of an array of nibble cells with column and row selectors and which is accessible and addressable by columns and by rows.

One embodiment shown in FIG. 9 is an array of words made of a plurality of nibble cells, some embodiments of which are shown in FIGS. 4 & 5. A cell to hold a nibble value (4-bits) can be made in a plurality of ways. As long as a nibble value can be stored, retrieved and accessed (written or read or cleared) along a row or along a column of a matrix or an array, it can be used to construct a larger array to hold nibbles, bytes, short word values or words of any length. As shown in this embodiment of the invention, row bit lines (vertical bit lines in figure) [901] are coupled along each column length of the array. The controlling row address lines such as [903] along a row are all coupled. Also, the column bit lines (horizontal bit lines in figure) such as [902] along a row are all coupled. And the controlling column address lines such as [904] are coupled along each column. Nibble values read on a plurality of row bit lines such as [901] using previously described methods, are selected via block selector [911] which provides a vector of nibbles at its output. Analogously, nibble values read from the stored cells on to a plurality of column bit lines such as [902] via previously described methods, are selected via block selectors [910] which provides a vector of nibbles at its output.

Figure 10:
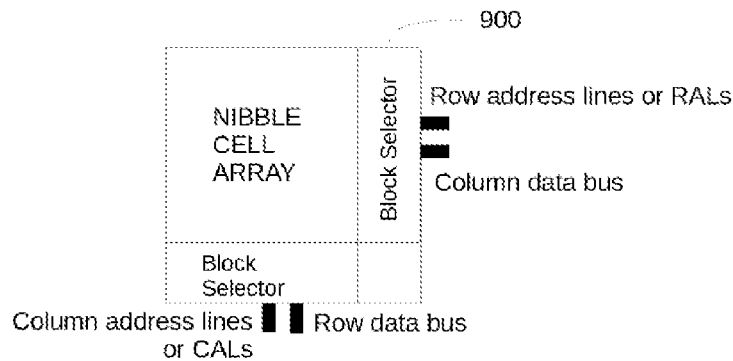
FIG. 10 shows one embodiment of a compact array of 16-bit words comprising of four arrays of nibble cells that is accessible and addressable by columns and by rows.
Figure 10:
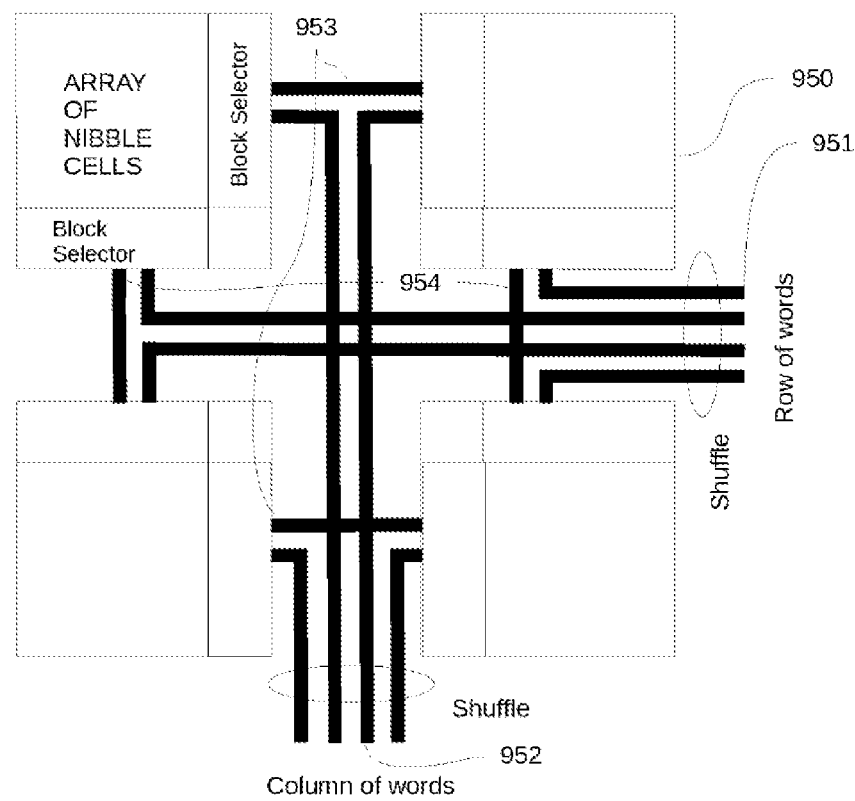

FIG. 10 shows one embodiment of an array of words comprised of four arrays of nibbles which were described previously. This embodiment of an array of words stores 16-bit short binary words that can be accessed by rows and by columns at the respective ports coupled to [951] and [952]. Upon selecting a subset of a plurality of controlling row address lines (RAL) comprising [953], the coupled and controlled row bit lines inside array [950] receive values from the storage cells in [950] for the rows selected. Based on the block selection made in [950], the selected row values of the selected blocks appear on the coupled row data bus [951]. Each nibble array provides one of four nibbles for each short word that is read out.

Analogously, selecting a plurality of columns by selecting a subset of a plurality of controlling column address lines such as [954], a plurality of values in a column of the arrays are retrieved and driven on to coupled column bit lines which pass through block selectors in arrays such as [950]. The blocks that are selected enable the values on the column bit line to appear on a coupled column data bus [952] at the output. Each nibble array provides one of four nibbles for each short word that is read out.

An arrangement with an embodiment as shown in FIG. 10 may be used as a matrix space to store, access, retrieve, hold, write, read or clear short words by rows or by columns or both. A plurality of the embodiment shown in FIG. 10 may be used to create an array or matrix space for longer length binary words such as 32-bit, 48-bit and 64-bit words.

Figure 11:
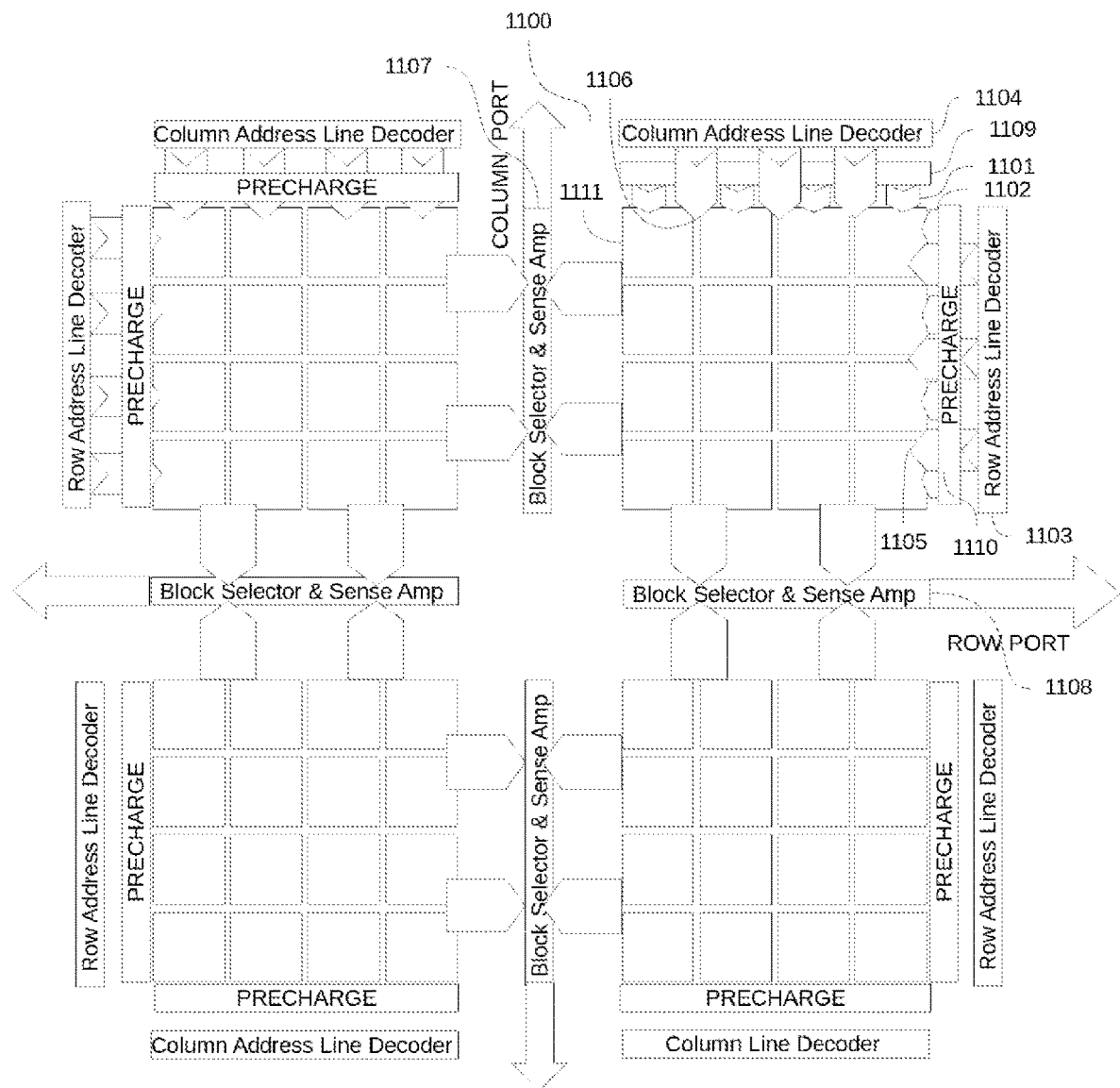
FIG. 11 shows one embodiment of a matrix space composed of arrays of words accessible and addressable by columns and by rows.

Storing and Accessing Matrices and Arrays Comprised of Long Words Inside a Matrix Space FIG. 11 shows one embodiment of a matrix space comprised of arrays that can hold matrices/arrays of long words. One embodiment of a matrix space is comprised of a plurality of array arrangements such as ones shown in the embodiment of FIG. 8. Another embodiment of a matrix space is comprised of a plurality of array arrangements created from the ones in FIGS. 9 and 10.

In the embodiment of a matrix space shown in FIG. 11 a bank arrangement [1100] is comprised of storage array [1111], pre-charge circuits [1109], [1110] coupled to row and column bit lines [1101], [1102] coupled to row and column block selectors with sense amplifiers [1108], [1107] at ports driving row and column data buses, respectively; also included in any such arrangement are a plurality of row and column address lines [1105], [1106] selected by row and column decoders [1103], [1104] to select the rows and columns of arrays to access, respectively. Four bank arrangements such as [1100] comprise the embodiment of the matrix space shown in FIG. 11. In the bank arrangement [1100] row bit lines (vertical bit lines in figure) [1101] are pre-charged by [1109] in the pre-charge phase of a clock (not shown) and are coupled to the cells of the arrays [1111] via FETs controlled by row address lines [1105].

To read a row of words, the row bit lines [1101] are pre-charged using pre-charge circuit [1109] in the pre-charge phase of a clock; a row address is presented to row address decoders such as [1103] in all four banks like [1100], which select row address line such as [1105] in the beginning of the read phase of the clock; row address line [1105] turns on the FETs which pass values read out of the array cells on to the row bit lines such as [1101] during the read phase; the values on the row bit lines such as [1101] are selected by the block selector and sensed by sense amplifiers [1108] that output the data word on to the row ports coupled to [1108]. This process happens simultaneously on each of the four array banks such as [1100]. In this embodiment of the invention each bank such as [1100] provides 16-bits of a 64-bit value for each element of a matrix or array.

Analogously, to read a column of words the column bit lines (horizontal bit lines) are pre-charged during pre-charge phase of clock; a column address is driven into column address decoders such as [1104] to select column address line such as [1106]. The selected column address line [1106] causes the coupled FETs to turn on and drive the values stored in cells in the selected columns to be read out on to column bit lines (horizontal bit lines in figure) such as [1102] coupled to block selectors such as [1107]; the selected column bit lines at the output of the block selectors [1107] are sensed by the sense amplifiers and the addressed column data is driven on to column data buses at the ports. Collating the values obtained on the column ports from all four banks provides 64-bit words at the outputs.

Storing a Matrix to System Memory from a Matrix Space

Figure 12:
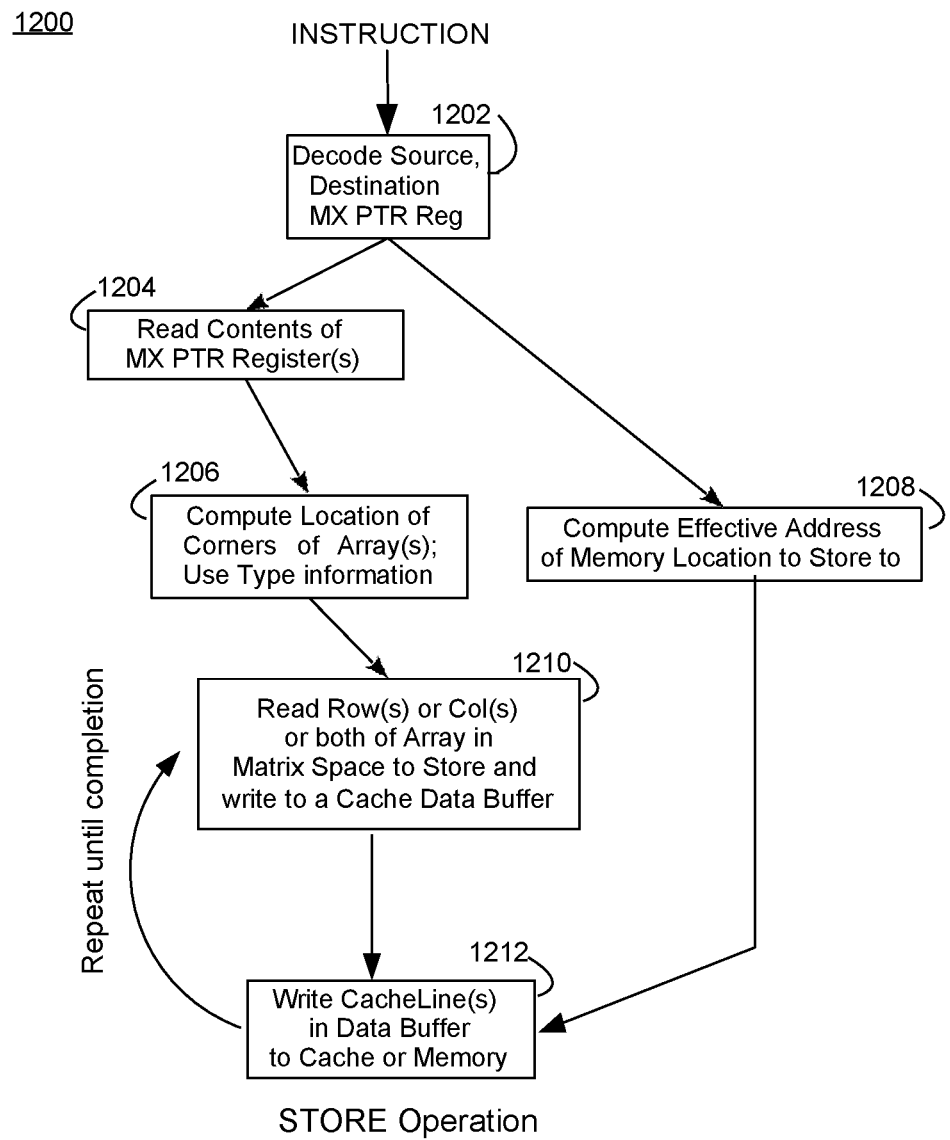
FIG. 12 illustrates a flowchart of an exemplary method to store a matrix or array into system memory in some embodiments.

Referring now to FIG. 12, a flowchart of some embodiments of a method to Store a matrix or array into System Memory or a main memory are illustrated. In some aspects it may be necessary to store a result matrix (or matrices) from a Matrix Space after a computation into system memory or a main memory. In step 1202 of method 1200, a STORE Matrix instruction is decoded and one or more source and destination operands including operands which are matrix pointer registers are determined/decoded. In step 1204 contents of the operand matrix pointer registers are read. In step 1206, location of the origins and sizes of one or more arrays, and the Type of the one or more arrays is determined. In step 1208 an effective address of a location in system memory or a main memory to access is computed. In step 1210 the one or more arrays are read out by rows or columns or both (as configured and controlled by the matrix instruction) from the Matrix Space and written into a data buffer (or a cache data buffer). In step 1212 the data in the data buffer are written using the effective address into the associated location in the system memory or a main memory, or into one or more corresponding cache lines of a cache associated with the main memory. Steps 1210 and 1212 may be repeated till all the data controlled by the STORE Matrix instruction is stored.

In some aspects, the user may follow the method in the flowchart shown in FIG. 12 to store a Matrix A 210 in Matrix Space 201, in some embodiments illustrated in FIGS. 2A-2C. In some embodiments, a program may set up location 281, 282, size 283, 284 and Type 285 information for A into a Matrix Pointer Register 203 prior to the STORE Matrix instruction execution. In some aspects a STORE Matrix instruction may be decoded inside computing processor 200 and the number of a register holding a pointer of a location in system memory may be determined in step [1202] along with the address of the Matrix Pointer register 203. In some embodiments, the pointer may be used in step [1208] to compute an effective address pointing to the location of a buffer in memory or may also be used to find its image in a cache into which matrix A is to be written. In some implementations, in step [1204] the contents 203 may be read giving the extent or size of Matrix A at 210 along with the position of 210 which are used in step [1206] as discussed earlier in this disclosure. In step [1210] the contents of Matrix A are also read from its location 210 inside Matrix Space 201 by row, or by column, or both and transferred to Data Buffer. In step [1212] the contents of the data buffer may be transferred to a cache or an embedded memory in the chip or to system memory 261 or a main memory at the computed effective address, and thereafter the instruction may be retired to complete the process of storing matrix A. In an ordinary sense, the instruction in this context also implies a hardware operation that is started by some means and is run to completion, in some embodiments.

Access Control and Space Allocation for Matrices Used in a Process

Figure 13:
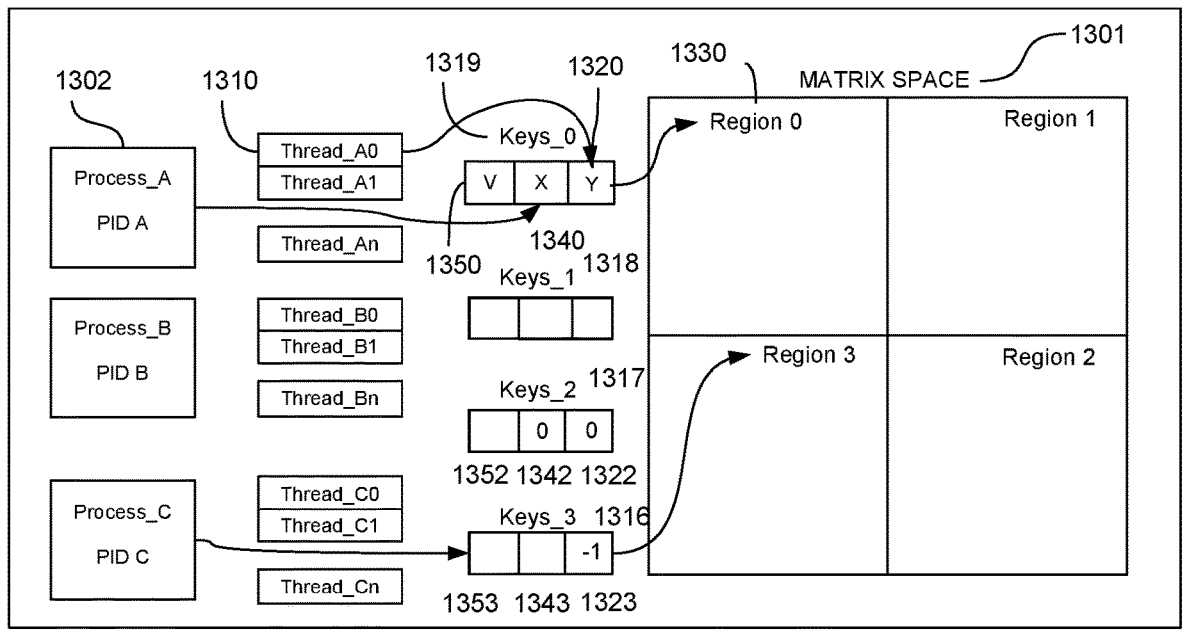
FIG. 13 illustrates a Matrix Space divided into 4 matrix regions, wherein each matrix region may be secured by a group of keys as in some embodiments.

Referring now to FIG. 13, some embodiments of a Matrix Space divided into Matrix Regions are illustrated, wherein each Matrix Region may be secured by a triad of keys. In some embodiments fewer or more keys may be used in lieu of a triad. In some embodiments, a Matrix Space 1301 in a processing unit may be assigned or divided into one or more Matrix Regions to control ownership and access control rights to locations or allocations within it. Pre-allocation of Matrix Region may allow for uniquely secured sections, where access may be limited to a specific Matrix Region.

For example, a customer may be pre-allocated a single Matrix Region, wherein instructions for the customer may be run only in the pre-allocated Matrix Region. When not in use, the Matrix Region may not be accessible by other customers or programs and may not be processed as available Matrix space. This may allow for increased security. In some embodiments, the Matrix Space 1301 may be divided into 4 matrix regions, each of which may be independently secured and/or shared by assigning them properties using one or more privileged instructions by an operating system or a virtual machine (VM) monitor (also referred to as a hypervisor) running on the machine. In some aspects, the properties of a region may be assigned by the OS or hypervisor based on policies that may be configured a priori and as requested by an application process. A process thread may make further OS calls to request a set of attribute values for sharing and security settings to govern the allocated region. In some implementations, at the time of region allocation, the OS may optionally clear the information content or values held in that region of the Matrix Space 1301 in some embodiments. In some embodiments an allocation policy setting may be used to forbid any instruction from causing the contents of a region to be transferred to another region or be used as a source operand in a computation whose results go to another region. In some embodiments, regions in a Matrix Space 1301 may be allocated and secured by an access control mechanism comprising a set of thread registers such as 1310, a set of key registers such as 1319 (Keys_0) (and also key registers Keys_1, Keys_2, Keys_3) and control logic in HW (not shown) working in conjunction with an OS or hypervisor. In some embodiments, a region 1330 (Region 0) may be allocated and secured for a thread Thread_A0 registered in thread register 1310 of a process 1302 with process identifier numbered or named as Process_A by an Operating System call or hypervisor call. This call may use a privileged instruction for matrix region allocation to assign a free region to a process for matrix computing among those available in a list maintained by the OS or the hypervisor.

Locking and Unlocking Allocated Regions on a Context Switch or an Interrupt

In some embodiments of FIG. 13, in a Matrix Space 1301 comprising 4 matrix regions, each matrix region may be controlled by a key register such as 1319 comprising three key fields 1320, 1340 and 1350 holding three keys Y, X and V respectively. In some aspects, a first key V called the Group Key V in a group key field 1320 may be associated with either an OS (in a multi-OS environment) or a process group. In some embodiments, a Process Group Identifier may be associated with a process group comprising one or more processes collected into the process group; such a Process Group Identifier is an identifier of a collection of PIDs (Process Identifiers) of processes running on a system under an OS. In some aspects, a second key X called the Process Key X in process key field 1340 may be associated with an individual process via its process identifier (PID). In some embodiments, a third key Y called the Thread Key Y in thread key field 1350 may be associated with a group of threads inside a process. In some aspects, each matrix region may have an associated Keys register with 3 fields each holding one of the above keys. One fixed value of a key may be used to block all threads of a process from accessing an associated region. Another fixed value of a key may be reserved for enabling all threads of a process to access that region of Matrix Space 1301.

In some embodiments, a 0 value in the Thread Key field of a region may block all threads in a process from accessing the region, and all 1s value (equal to signed value −1 in some aspects) in that Thread Key field may enable all threads of that process to access the region. Similarly, a 0 value in the Process Key field of a matrix region's Key register may prevent every process in the associated process group from accessing the region, and an all 1s value may enable all processes in the associated process group to access that region of Matrix Space 1301.

In some aspects, key values other than 0 or all 1s may be leased to individual processes by an OS or hypervisor, wherein the leasing may allow the one or more individual processes to access specific regions of Matrix Space 1301 leased to them by an OS or hypervisor while blocking all other processes. Such a capability may be required when an interrupt occurs, and the OS is required to run some other process or a thread that may not access a region. In some implementations, this may allow the OS to quickly swap out a process or thread while locking that matrix region to all others. Upon resumption of the process leasing the region, the HW conducting access control may check and unlock the region to the thread(s) holding the correct keys once again.

In some embodiments, region 1330 (Region 0) inside a Matrix Space 1301 may be controlled in part by a Thread Key field 1320 in a Key Register 1319. In some aspects, holding a unique and non-zero value Y in Thread Key field 1320 that may be assigned by an OS exclusively may secure region 1330 (Region 0) to a thread Thread_A0 registered in thread register 1310. Here, key value Y which may not be equal to all 1s (or all 0s), may authenticate and enable only a thread holding a corresponding private key such as Thread_A0 registered in thread register 1310 of the Process_A 1302 to access region 1330 of the Matrix Space 1301. In some other aspects, the private part of key value Y held by threads Thread_A0 and Thread_A1 assigned by an OS to them, non-exclusively between the two, may allow both of them to share and access region 1330 (Region 0) while securing region 1330 from other threads and processes. The exact encryption, decryption, key generation, key management, key assignment and key exchange schemes may be various and different in different embodiments.

In some implementations, the Thread Key field 1323 controlled by Process_C may have an all 1s value (equal to a signed constant −1) in the keys register Keys_3 which may allow all threads of Process_C to access Region 3. In some embodiments, both the Process Key Field such as 1342 and Thread Key Field such as 1322 may hold a 0 value for each. This may lock up region 2 to all processes and threads until an OS or hypervisor change the keys. In some aspects, the OS or hypervisor may unlock the region by loading a correct set of keys to provide appropriate access. In some implementations, the Key field 1350 may be used to put a region under the control of an OS by a Virtual Machine hypervisor. In some embodiments, it may be controlled by an OS to restrict access to a smaller pool of processes that comprise a Process Group.

In some embodiments, a subset of keys or key fields may control only process level access privileges. This may be beneficial for system performance and ease of use. In some embodiments, keys may be used to control locking and sharing properties of individual regions or group of regions. In some aspects, Regions may be controlled recursively using multiple keys, and sub-regions or partitions of regions may be controlled more finely or coarsely using one or more keys.

In some implementations, instructions to Lock and Unlock using operands to copy to, write to, or control key registers may be provided for use by a process or its thread(s) for locking and unlocking matrix regions. The instructions may hold their matrices or arrays for computations. In some embodiments, a mechanism to encrypt the contents of a region or the keys may require authentication to secure the locking process. In some embodiments, no authentication may occur or be required. In some aspects, a customizable authentication may be installed upon request.

In some embodiments, one or more portions of a matrix region are dynamically entered into a desired power state independently during operation. In some embodiments, the desired power state is chosen from a list comprising one or more low power states which are often referred to as sleep states, an off state, and one or more states of operation during which computation may proceed. It is possible to configure the matrix regions such that one or more of them are in low power states while the remaining are in a state of operation. Individual matrix regions may be put into a low power state or powered off to save power independently.

In some embodiments, a machine configured to use a computer-implemented instruction set may comprise highly structured multi length instructions with lengths in exact multiples of 16-bits (i.e. 16 bits, 32 bits, 48 bits, 64 bits, and such) that may be designed for use in matrix, array, and vector processing along with general computing. This may also include graphics processing and neural network computations. In some aspects, the instructions may comprise a bit field that may determine instruction length that differentiates 16-bit length instructions from 32-bit instructions. In some implementations, a longer length instructions whose position may be invariant in all instructions may occur in the portion first decoded.

In some aspects, a field comprising bits may be designated and used as a major opcode whose position in all instructions may be invariant and may occur in the portion first decoded. In some implementations, a field may comprise bits used to modify the functionality of the major opcode and may partition an instruction set into a plurality of sub-sets, which may be customized, such as based on business limitation, simpler design, or combinations thereof, as non-limiting examples. In some aspects, the position may be invariant in all instructions and occurs in the portion first decoded.

In some aspects, a field comprising bits that identify instructions may be used by one or more built-in special function application and specific co-processor units, wherein the position may be invariant in all instructions and may occur in the portion first decoded. In some embodiments, a field comprising bits may be designated as a primary destination operand or a source operand whose position may be invariant in all instructions and may occur in the portion first decoded. In some implementations, various fields of bits may be designated for use as source operands, secondary destination operands, secondary or tertiary or miscellaneous opcodes, row or column or level designators, attributes, immediate values, memory pointers, miscellaneous operands, or miscellaneous opcodes to control instruction execution.

In some implementations, an embedded storage, such as a matrix space, may be configured to hold or store matrices (matrixes), single, double or multi-dimensional arrays such as matroids and vectors, wherein the embedded storage may comprise rows, columns of elements of binary values of any type either numeric or non-numeric. In some aspects, these elements may be singular or in plural and may be controlled or accessed by rows, columns, or both during transport and computation.

In some embodiments, a method and apparatus comprising a set of machine instructions (and their assembly language equivalent names) may be used to control, access, load, store, restore, set, transport, shift, manipulate, perform operations including logical, bit-manipulation and arithmetic and non-arithmetic operations. In order to execute steps of algorithms and or manipulations of the aforementioned vectors, there may exist arrays, matrices, or any of the contents held within the aforementioned matrix space along with contents of other registers or storage outside the matrix space on a plurality of stored elements parallelly, which may occur simultaneously, concurrently, or concomitantly. In some implementations, hardware, methods and instructions may control the state of a matrix space (including operations to reset, power on, power down, clock on, clock off, lock, secure, unlock, encrypt, decrypt or control in any manner to effect its state).

In some aspects, a set of one or more matrix pointer registers may be used to hold the location, size and operand type information of matrices or arrays stored in the matrix space. In some implementations, a method and apparatus may address and control matrices or arrays stored in the matrix space comprising of matrix pointer registers. In some embodiments, a matrix pointer register may hold a pair of row, column, or both addresses of the origin position of a matrix, which may be a pre-designated element-position in the matrix. In some aspects, the position may be a corner along with the size of the matrix given in terms of number of elements in its rows and number of elements in its columns (or in terms of numbers of rows and columns) of the matrix.

In some embodiments, defining its extent, a matrix pointer register may be used to control, store, and access one or more elements of a matrix or array by its rows, columns, or both. In some aspects, the control, storage, and access may occur in patterns within the matrix or arrays, such as its diagonals, sub-diagonals, a triangular sub-array, a tri-diagonal sub-array, a rectangular sub-array or a sub-array of a priori user-defined positions of the said matrix or array. In some implementations, there may be a plurality of machine instructions (and their assembly language equivalent) comprising the instruction set to control, access, load, store, restore, set, and compute using arithmetic, logical, and bit-manipulation operations.

In some embodiments, with the contents of these registers and the contents of the vectors, matrices, arrays inside, or those associated with the matrix space (including those held in system memory or other registers outside the matrix space), a type designation may identify the type of binary elements of a matrix.

As illustrative examples, the identifying may distinguish between bytes, short integers, integer words, long integers, pointers (to a memory location), half precision floating point numbers, single precision floating points, double precision floating points, extended and quad precision floating point numbers, ordered pairs (a collection of 2 values) of any integer types, ordered pairs of any floating point types, ordered quads (a collection of 4 values) of any integer types, ordered quads of any floating point types, triads of integer types, triads (a collection of 3 numbers) of floating point types, ordered quads or triads or pairs of nibbles or bytes, and other types comprising of values with no designated type that may comprise collections of a user-defined number of bits each.

In contrast to prior art that may identify a numeric value, the present invention may process complex strings comprising numbers, letters, segments, and combinations thereof. This may allow for separate processing of the different types, which may increase efficiency and allow for effective and efficient processing of complex strings with relatively low computing costs. In some aspects, various methods may interpret ordered pairs of values as complex numbers, quads, and triads of binary values as points, triangles or vectors in a geometric space or as elements of a tensor in computations using machine instructions. In some embodiments, various methods may be used to interpret these quads and triads of binary values as pixel intensities and colors, and as other possible groupings interpreted by instructions that act on them.

Some embodiments may comprise a plurality of instruction structures and modes. In some aspects, individual instructions for computing may comprise matrices and arrays or their parts comprising numeric or non-numeric binary values along with a plurality of binary values that may be elements of other matrices or their parts, vector registers or their parts, scalar register operands, memory operands, and immediate values of a variety of types.

In some aspects, methods and accompanying logic may be used to access one or more matrix (or matrices) or arrays in an embodiment of the matrix space for an operation, wherein the contents of one or more matrix pointer registers may be readable concurrently or simultaneously and each of which may be associated with a matrix or array in the matrix space. In some embodiments, a method may interpret the contents of the fields of a matrix pointer register as a pair of row and column and may address an origin or corner element of said matrix or array inside the matrix space. In some implementations, a method may identify the size in terms of a pair of numbers that may give the number of elements in the rows and columns of the said matrix or array.

In some aspects, a method may interpret the type field of the matrix pointer register, which may associate it with the type of elements of the said matrix or array. In some implementations, a set of method and apparatus may access, read, and control one or more elements of a matrix or array by row or by column or both, along with other operands like vector registers or scalar values or immediate operands from their locations of storage and may also perform computation and generate results. In some embodiments, a set of methods and apparatus may store the results of computation into a matrix held inside a matrix space via its ports into vector registers or scalar registers as the instruction may stipulate.

In some implementations, a method and apparatus may load one or more matrices or arrays from a memory, an embedded memory, or a processor cache into a matrix space that may use a load instruction. In some aspects, a set of methods and apparatus may store one or more matrices or arrays into a memory, an embedded memory, or a processor cache from a matrix space that may use a stored instruction.

Some aspects may comprise an access control mechanism and a set of attributes to secure a matrix space or portions of it to make them accessible and controllable by specific threads of specific processes of specific operating systems running on a computing machine. In some embodiments, these may be defined as a spatial division of the matrix space into one or more regions controlled by a set of instructions and logic to control the security and sharing attributes of these regions. In some aspects, the spatial division may be dynamic, wherein the division may change and adapt based on the needs of the computing.

In some embodiments, one or more regions may comprise one or more partitions, and the access control mechanism may comprise encryption, decryption and security hardware and a plurality of registers that may hold binary valued keys to block or enable access to one or more regions by specified threads belonging to specified processes that may lease these secret or encrypted keys from an operating system or a virtual machine hypervisor.

In some implementations, the keys may comprise one or more fields, and a plurality of canonical key values like 0 and −1 (all is in a binary word) may designate complete blocking or full access to all threads or all processes. In some aspects, a plurality of fields in keys may allow an operating system to control a region of matrix space as stipulated by a virtual machine hypervisor. In some embodiments, methods and logic may be used to lock or unlock access to each matrix region in the aforementioned matrix space by a thread of a process making a request to an operating system using a privileged instruction under operating system control.

In some embodiments, a method and apparatus may comprise an immediate operand register that may be used in conjunction with a plurality of machine and assembly language instructions. In some aspects, a payload instruction may comprise an opcode and an immediate value operand that may be stored by a processing unit into an immediate operand register within it. In some implementations, a method and apparatus may decode the payload instruction with its immediate operand in a program sequence and pass the result for use with a preceding or succeeding instruction with or without an immediate operand for execution.

In some embodiments, a method and apparatus may comprise a shifter or a shift control register to hold a shift value and an immediate operand register that may be able hold a resultant immediate operand. In some implementations, a logic circuit may be pre sent in an immediate operand from an instruction to the aforementioned shifter to perform a shift. In some implementations, it may concatenate it to the existing value in the immediate operand register. In some aspects, a logic circuit may compute a new shift value and place it into the shift control register prior to next instruction. In some embodiments, a mechanism may reset the aforementioned registers, and a method and apparatus may use the resultant immediate operand in the immediate operand register as an immediate operand in the execution of an instruction.

What is claimed is:

1. A method to secure a region in a storage entity and to authenticate a thread to permit or block access to the region comprising:
   storing a group key value into a group key field of a key register of the region; and
   storing a process key value into a process key field of the key register;
   matching a group key of a process group with the group key value in the group key field of the key register to authenticate and affirm or deny permission to access the region, wherein the process group is identified using a process group identifier; and
   matching a process key of a process with the process key value in the process key field of the key register to authenticate and affirm or deny permission to access the region, wherein the process is identified by a process identifier; and
   responsive to the process key match and group key match, affirming access permission, and responsive to affirming access permission, entering the region into a power state of operation, and wherein the storage entity is configured to hold at least one array that is accessible by rows and columns, and wherein, the at least one array is also accessible by both rows and columns concurrently.

2. A computing machine comprising: a storage entity configured to hold at least one array that is accessible by a row address and also by a column address, wherein the at least one array is accessible by both the row address and the column address concurrently;
   at least one register configured to store an origin of the at least one array in the storage entity, a size of the at least one array, and a type of the at least one array; and
   wherein a portion of the storage entity is configured to enter or exit a power state.

3. The computing machine of claim 2 further comprising a set of machine instructions configured to control the storage entity.

4. The computing machine of claim 2, wherein the storage entity comprises at least one region.

5. The computing machine of claim 4, further comprising at least one key, wherein the at least one key comprises at least one of a group key, or a process key, or a thread key.

6. The computing machine of claim 5, wherein the at least one region is secured by the at least one of a group key, or a process key, or a thread key.

7. The computing machine of claim 5, wherein the group key controls access by an operating system, or wherein the process key controls access by a process, or wherein the thread key controls access by a thread.

8. The computing machine of claim 7, wherein the process is identified by a process identifier, or the thread is identified by a thread identifier, or the operating system is identified by a group identifier.

9. The computing machine of claim 5, wherein the group key controls access by a group comprising processes identified by their respective process identifiers.

10. The computing machine of claim 9, wherein a user has ownership of the group comprising processes identified by their respective process identifiers.

11. The computing machine of claim 5, wherein a thread is registered by its thread identifier in a thread register.

12. The computing machine of claim 5, wherein the group key is stored in a group key field of a key register, or the process key is stored in a process key field of the key register, or the thread key is stored in a thread key field of the key register.

13. The computing machine of claim 4, wherein the at least one region is configured to be shared by one or more threads.

14. The computing machine of claim 4, wherein the at least one region is controllable or configurable by one or more of, a monitor program, or a hypervisor, or a virtual machine monitor, or an operating system.

15. The computing machine of claim 4, wherein the at least one region is used by at least one process or at least one thread.

16. The computing machine of claim 15, wherein the at least one process or the at least one thread originate from one of a user application, an operating system, or a hypervisor.

17. The computing machine of claim 4, wherein an access control mechanism secures the at least one region, wherein the access control mechanism comprises a set of key registers associated with the at least one region, control logic, and at least one of:
   a set of process registers, or
   a set of thread registers.

18. The computing machine of claim 17, wherein the access control mechanism uses at least one of:
   a group key to authenticate an operating system to permit or block access of the operating system to the at least one region; or
   a different group key to authenticate a process group to permit or block access of the process group to the at least one region; or
   a process key to authenticate a process to permit or block access of the process to the at least one region; or
   a thread key to authenticate a thread to permit or block access of the thread to the at least one region.

19. The computing machine of claim 18, wherein access by one or more threads to the at least one region is authenticated through a single canonical key value.

20. The computing machine of claim 18, wherein access by one or more threads to the at least one region is blocked through a single canonical key value.

21. The computing machine of claim 18, wherein access by one or more processes to the at least one region is controllable by a single process key value.

22. The computing machine of claim 18, wherein respective accesses by a plurality of processes to the at least one region are independently controllable.

23. The computing machine of claim 4, wherein access permission to the at least one region is assigned when the at least one region is first allocated.

24. The computing machine of claim 4 wherein access permission to the at least one region is modified during computation.

25. The computing machine of claim 24 wherein access permission to the at least one region remains unchanged when a portion of the computing machine enters or exits a power state.

26. The computing machine of claim 2, wherein the power state is chosen from a list comprising one or more low power states, an off state, and one or more states of operation.

27. A method to configure a storage entity comprising:
   configuring the storage entity to hold at least one array that is accessible by rows and columns, and further, by both rows and columns concurrently;
   configuring at least a portion of the storage entity to enter or exit a power state; and
   configuring at least one register to store an origin of the at least one array in the storage entity, a size of the at least one array, and a type of the at least one array.

28. The method of claim 27 further comprising steps to secure a region in the storage entity in the computing machine comprising:
   storing a group key value into a group key field of a key register of the region;
   storing a process key value into a process key field of the key register; and
   storing a thread key value into a thread key field of the key register.

29. The method of claim 1, wherein the process group is owned by a user.

* * * * *